United States Patent
Kabasawa et al.

(10) Patent No.: US 8,441,436 B2
(45) Date of Patent: May 14, 2013

(54) INPUT APPARATUS, CONTROL APPARATUS, CONTROL SYSTEM, CONTROL METHOD, AND HANDHELD APPARATUS

(75) Inventors: Hidetoshi Kabasawa, Saitama (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 578 days.

(21) Appl. No.: 12/526,463

(22) PCT Filed: Dec. 1, 2008

(86) PCT No.: PCT/JP2008/071811
§ 371 (c)(1),
(2), (4) Date: Aug. 7, 2009

(87) PCT Pub. No.: WO2009/072471
PCT Pub. Date: Jun. 11, 2009

(65) Prior Publication Data
US 2010/0259477 A1    Oct. 14, 2010

(30) Foreign Application Priority Data
Dec. 7, 2007 (JP) .................. 2007-317748

(51) Int. Cl.
*G09G 5/00* (2006.01)
(52) U.S. Cl.
USPC .......................................... 345/156; 345/157
(58) Field of Classification Search ........... 345/156–184
See application file for complete search history.

(56) References Cited

U.S. PATENT DOCUMENTS
2005/0062719 A1* 3/2005 Hinckley et al. .............. 345/163

FOREIGN PATENT DOCUMENTS

| JP | 09-055910 | 2/1997 |
|---|---|---|
| JP | 09-282085 | 10/1997 |
| JP | 2001-056743 | 2/2001 |
| JP | 3264291 | 3/2002 |
| JP | 2002-207567 | 7/2002 |
| JP | 2005-196797 | 7/2005 |

OTHER PUBLICATIONS

International Search Report dated Mar. 10, 2009, for corresponding Patent Application PCT/JP2008/071811.

* cited by examiner

*Primary Examiner* — Kevin M Nguyen
*Assistant Examiner* — Cory Almeida
(74) *Attorney, Agent, or Firm* — K&L Gates LLP

(57) ABSTRACT

To provide an input apparatus, a control apparatus, a control system, a control method, and a handheld apparatus with which a movement of a pointer on a screen can be stopped, for example, with a simple operation or without a user being aware of the operation. An MPU judges whether absolute values of acceleration values are both equal to or smaller than a threshold value (hereinafter, referred to as threshold value for convenience). When both of the absolute values for the acceleration values are not equal to or smaller than the threshold value, the MPU transmits velocity values to a control apparatus. Otherwise, the MPU stops outputting (transmitting) the velocity values. Typically, a time when a position of a casing of an input apparatus falls within an angle range an angle ±α from a line that is perpendicular to a ground (horizontal plane) is a time when the absolute values become equal to or smaller than the threshold value.

9 Claims, 18 Drawing Sheets

INPUT APPARATUS, CONTROL APPARATUS, CONTROL SYSTEM, CONTROL METHOD, AND HANDHELD APPARATUS

CROSS REFERENCE TO RELATED APPLICATIONS

The present application is a National State of International Application No. PCT/JP2008/071811 filed on Dec. 1, 2008 and which claims priority to Japanese Patent Application No. 2007-317748 filed on Dec. 7, 2007, the entire contents of which are being incorporated herein by reference.

BACKGROUND

The present invention relates to a 3-dimensional operation input apparatus for operating a GUI (Graphical User Interface), a control apparatus for controlling the GUI in accordance with operational information, a control system including those apparatuses, a control method, and a handheld apparatus.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Patent Documents 1 and 2).

Patent Document 1 discloses an input apparatus including angular velocity gyroscopes of two axes, that is, two angular velocity sensors. Each angular velocity sensor is a vibration-type angular velocity sensor. For example, upon application of an angular velocity with respect to a vibrating body piezo-electrically vibrating at a resonance frequency, Coriolis force is generated in a direction orthogonal to a vibration direction of the vibrating body. The Coriolis force is in proportion to the angular velocity, so detection of the Coriolis force leads to detection of the angular velocity. The input apparatus of Patent Document 1 detects angular velocities about two orthogonal axes by the angular velocity sensors, generates, in accordance with the angular velocities, a signal as positional information of a cursor or the like displayed by a display means, and transmits it to a control apparatus.

Patent Document 1: Japanese Patent Application Laid-open No. 2001-56743 (paragraphs [0030] and [0031], FIG. 3)
Patent Document 2: Japanese Patent No. 3,264,291 (paragraphs [0062] and [0063])

Since, in actuality, the 3-dimensional operation input apparatus of this type is moved 3-dimensionally, a frequency of a movement of the 3-dimensional operation input apparatus including a movement of the 3-dimensional operation input apparatus unintended by a user is considered to be higher than that of a mouse that is moved within a 2-dimensional plane, for example. Therefore, there are cases where a user wishes to stop the movement of the pointer when not intending to move the input apparatus.

For example, in a case where the 3-dimensional operation input apparatus is used like a laser pointer in a presentation, if the pointer moves even when unintended by the user, people viewing a screen may find it visually bothersome. Not just in presentations but also when a moving image or a still image is displayed on a screen, for example, the visual botheration becomes prominent.

For solving the problems as described above, Patent Document 2 discloses processing in which, while an enter operation is being made by a pointing device (remote commander), that is, while a button is being pressed, a pointer is not moved. However, because it is difficult to make a distinction between an action that uses a movement of a hand of a user for arbitrarily moving a pointer and an action of pressing a button for stopping the movement of the pointer, the user is easily confused.

In view of the circumstances described above, there is a need is to provide an input apparatus, a control apparatus, a control system, a control method, and a handheld apparatus with which a movement of a pointer on a screen can be stopped, for example, with a simple operation or without a user being aware of the operation.

SUMMARY

According to another embodiment, there is provided an input apparatus including: a casing; an output means for detecting a status of the casing regarding a movement and position of the casing and outputting a status signal indicating the status of the casing; a movement signal output means for outputting a movement signal for moving the pointer on the screen based on a motion signal as a signal on the movement of the casing out of the status signal that has been output; a first judgment means for judging which of a first position as a predetermined position and a second position that is not the predetermined position the detected position of the casing is; and an execution means for executing, when the detected position of the casing is the first position, decorrelation processing for setting a status of the pointer on the screen to a status uncorrelated to the motion signal.

In another embodiment, when the position of the casing is the first position, the status of the pointer on the screen is set to a status uncorrelated to the motion signal of the casing. Therefore, a movement of the pointer on the screen corresponding to a movement of the casing unintended by the user can be prevented. Moreover, since the user is not required to perform an operation of consciously pressing a button or the like for stopping the movement of the pointer as in the related art, operations become easier.

The predetermined position refers to a position of the casing at a time when the user is not moving the input apparatus, a position of the casing at a time when the user is not paying attention to a position of the input apparatus, a position of the casing set by the user, and the like.

The predetermined position is a position that is practically constant within an absolute space or a position within a predetermined 2- or 3-dimensional tilt angle range of the casing. The 2-dimensional tilt angle range of the casing refers to a range of a tilt angle of the casing in a case where the casing is viewed in one direction (e.g., tilt angle from horizontal line or vertical line). The 3-dimensional tilt angle range of the casing refers to a range of a tilt of the casing in a case where the casing is viewed 3-dimensionally (e.g., tilt angle from horizontal plane or vertical plane).

The decorrelation processing is, for example, processing of stopping an output of a movement signal or outputting a signal for setting a movement amount of a pointer on a screen to 0, processing of outputting a signal for hiding a pointer, processing of outputting a movement signal with which the movement amount of the pointer sufficiently exceeds a size range of a screen, or processing of moving the pointer to an end portion (or predetermined coordinate position) of the screen at a constant velocity or by a set movement irrespective of the movement of the casing.

The output means includes at least one of a velocity-related value output unit for outputting a velocity-related value related to a velocity of the casing and an angle-related value output unit for outputting an angle-related value related to a rotational angle of the casing.

The velocity-related value output unit is a unit for outputting velocity values or acceleration values.

The velocity values are values obtained by integrating acceleration values detected by acceleration sensors or values obtained by an operation based on angle-related values output from the angle-related value output unit. Alternatively, the velocity values are values obtained by an operation based on the angle-related values and the acceleration values.

The acceleration values are values detected by the acceleration sensors or values obtained by an operation based on image data obtained by an image sensor.

The angle-related value output unit is a unit for outputting angle values, angular velocity values, angular acceleration values, and the like.

The angle values are values obtained by geomagnetic sensors, values obtained by integrating the angular velocity values, and the like.

The angular velocity values are values obtained by gyro sensors, values obtained by differentiating angle values output from a unit that outputs the angle values, and the like.

The angular acceleration values are values obtained by a second-order integration operation of the angle values or a second-order differentiation operation of the angular velocity values, values obtained by an operation based on acceleration values obtained by two or more physically-apart acceleration sensors, and the like.

Typically used as the motion signal of the casing out of the status signal are acceleration values, angular velocity values, or velocity values.

Typically used as a positional signal of the casing out of the status signal are acceleration values, angle values, or a signal obtained by a tilt switch sensor. Among those, the acceleration values may also be used as the motion signal, for example.

The input apparatus further includes a time judgment means for judging whether a state where the position of the casing is the first position is maintained for a predetermined time period, and the execution means executes the decorrelation processing when the state where the position of the casing is the first position is maintained for the predetermined time period. There may also be a case where the position of the casing accidentally becomes, for example, the first position even while the user is performing a pointing operation by moving the input apparatus. However, in the present invention, because the decorrelation processing is not executed unless the first position of the casing is maintained for a predetermined time period, there is a merit in such an accidental case. In other words, accuracy in detecting whether the movement of the pointer matches a movement intended by the user can be enhanced.

The input apparatus further includes a second judgment means for judging whether the position of the casing is within a predetermined positional range that includes the first position and is wider than the first position, after the casing has shifted from the second position to the first position, and the execution means continues executing the decorrelation processing when the position of the casing is within the predetermined positional range that is wider than the first position. Specifically, different positional ranges of the casing are set for a case where the casing shifts from the second position to the first position and a case where the casing shifts from the first position to the second position. Accordingly, a situation in which the decorrelation processing by the execution means is sometimes executed but sometimes is not can be prevented from being repeated frequently when the casing is moved between the first position and the second position even when unintended by the user.

The output means outputs, as the status signal, a first acceleration value of the casing in a direction along a first axis and a second acceleration value of the casing in a direction along a second axis different from the first axis. Typically, the screen is substantially vertical or almost vertical to a horizontal plane. Moreover, when the user moves the input apparatus to perform a pointing operation, the user typically holds the casing so that the first axis and the second axis become axes that are included in a vertical plane or almost-vertical plane.

The first axis and the second axis may be orthogonal axes, but do not need to be orthogonal. Even when the axes are not orthogonal, the first acceleration value and the second acceleration value may be converted into values along the orthogonal axes by an operation that uses a trigonometric function. The same holds true for a relationship to be described later between a plane that includes the first axis and the second axis and a third axis that intersects the plane.

The first judgment means judges whether absolute values of both the first acceleration value and the second acceleration value are equal to or smaller than a threshold value, and judges that the detected position of the casing is the first position when both of the absolute values are equal to or smaller than the threshold value. Typically, the execution means executes the decorrelation processing when the position of the casing is changed so that an angle of the plane including the first axis and the second axis with respect to the vertical plane increases and both the first acceleration value and the second acceleration value become 0 or fall within a predetermined range including 0.

Threshold values of the absolute values of the first acceleration value and the second acceleration value only need to be the same. However, the threshold values may be different values, or may be values close to each other.

Alternatively, a judgment may be made on whether an operational value obtained based on the first acceleration value and the second acceleration value is equal to or smaller than a threshold value. The operational value is a value obtained by an addition, multiplication, or vector operation of the first acceleration and the second acceleration, or by other operational expressions.

The output means may additionally output, as the status signal, a third acceleration value of the casing along a third axis that intersects a plane including the first axis and the second axis. The third axis is an axis that intersects the plane including the first axis and the second axis, that is, an axis unparallel to that plane. The movement signal output means may use the third acceleration value as the motion signal.

The first judgment means judges whether an absolute value of the third acceleration value is equal to or larger than a threshold value, and judges that the detected position of the casing is the first position when the absolute value of the third acceleration value is equal to or larger than the threshold value. Accordingly, the first judgment means can carry out judgment processing by merely monitoring the third acceleration value without using the first acceleration value and the second acceleration value, with the result that an operational amount can be reduced.

The first judgment means may judge that the detected position of the casing is the first position when an absolute value of at least one of the first acceleration value and the second acceleration value is equal to or smaller than a first threshold value and an absolute value of the third acceleration value is equal to or larger than a second threshold value.

The first judgment means includes a first judgment section that judges whether an absolute value of the third acceleration value is equal to or larger than a threshold value and a second judgment section that judges which of positive and negative a sign of the third acceleration value is, and the first judgment means judges that the detected position of the casing is not the first position when the absolute value of the third acceleration value is equal to or larger than the threshold value and the sign is a predetermined sign of either one of the positive and negative. Specifically, the decorrelation processing is executed when the casing faces a certain direction or a direction close to that direction, and the decorrelation processing is restricted when the casing faces a direction opposite to that direction or a direction close to that opposite direction.

In the input apparatus, the first judgment means judges whether a resultant vector operational amount of the first acceleration value, the second acceleration value, and the third acceleration value is within a predetermined range, and judges that the detected position of the casing is the first position when the resultant vector operational value is within the predetermined range.

The input apparatus further includes a generation means for generating, when it is judged by the first judgment means that the position of the casing has shifted from the first position to the second position, a signal for displaying the pointer at a predetermined coordinate position on the screen.

If it is already recognized by the user that the pointer will be displayed at a predetermined coordinate position, it becomes easier to perform a pointing operation after the shift to the second position.

The predetermined coordinate position is typically a center position of the screen. For example, since the user often restores the input apparatus in the second position while facing it toward a center of the screen, if the pointer starts moving from the center position of the screen, the operation becomes more intuitional for the user.

However, the predetermined coordinate position is not limited thereto and may be an arbitrary position on the screen. The input apparatus or a control apparatus that receives a signal transmitted from the input apparatus may include means for causing the user to customize the coordinate position.

The input apparatus further includes a cancel means including an operation switch, for canceling the decorrelation processing by the execution means when it is judged by the first judgment means that the position of the casing has shifted from the first position to the second position and when an input signal from the operation switch is obtained. By the user inputting an operation by the operation switch, the decorrelation processing can be canceled and the user can resume the pointing operation.

The input apparatus further includes a mounting section to which a holder for holding the input apparatus at an arbitrary place is mounted, and the first judgment means judges which of the first position and the second position the position of the casing is with a predetermined positional range centering on a position at which a virtual line, which connects the mounting section and a center of gravity of the input apparatus, coincides with a gravity direction being set as the first position. Accordingly, when the user holds the input apparatus via the holder, for example, the position of the casing automatically becomes the first position (predetermined angle range) by a weight of the input apparatus itself, which is convenient.

Although the mounting section is typically provided to the casing, it may instead be provided to a part of the input apparatus that does not function as the casing.

An arbitrary position may be a part of a body of a user (human being) or may be a part of an object.

According to another embodiment, there is provided a control apparatus controlling a movement of a pointer on a screen based on a status signal and a movement signal transmitted from an input apparatus including a casing, an output means for detecting a status of the casing regarding a movement and position of the casing and outputting the status signal indicating the status of the casing, a movement signal output means for outputting the movement signal for moving the pointer on the screen based on a motion signal as a signal on the movement of the casing out of the status signal that has been output, and a transmission means for transmitting the status signal and the movement signal, the control apparatus including: a reception means for receiving the status signal and the movement signal; a coordinate information generation means for generating coordinate information of the pointer on the screen based on the received movement signal; a first judgment means for judging which of a first position as a predetermined position and a second position that is not the predetermined position the position of the casing is based on the received status signal; and an execution means for executing, when the position of the casing is the first position, decorrelation processing for setting a status of the pointer on the screen to a status uncorrelated to the motion signal.

According to another embodiment, there is provided a control apparatus controlling a movement of a pointer on a screen based on a status signal transmitted from an input apparatus including a casing, an output means for detecting a status of the casing regarding a movement and position of the casing and outputting the status signal indicating the status of the casing, and a transmission means for transmitting the status signal, the control apparatus including: a reception means for receiving the status signal; a movement signal output means for outputting a movement signal for moving the pointer on the screen based on a motion signal as a signal on the movement of the casing out of the received status signal; a coordinate information generation means for generating coordinate information of the pointer on the screen based on the movement signal; a first judgment means for judging which of a first position as a predetermined position and a second position that is not the predetermined position the position of the casing is based on the received status signal; and an execution means for executing, when the position of the casing is the first position, decorrelation processing for setting a status of the pointer on the screen to a status uncorrelated to the motion signal.

According to another embodiment, there is provided a control system controlling a movement of a pointer on a screen, including an input apparatus and a control apparatus. The input apparatus includes a casing, an output means for detecting a status of the casing regarding a movement and position of the casing and outputting a status signal indicating the status of the casing, a movement signal output means for outputting a movement signal for moving the pointer on the screen based on a motion signal as a signal on the movement of the casing out of the status signal that has been output, and a transmission means for transmitting the status signal and the movement signal. The control apparatus includes a reception means for receiving the status signal and the movement signal, a coordinate information generation means for generating coordinate information of the pointer on the screen based on the received movement signal, a first judgment means for judging which of a first position as a predetermined position and a second position that is not the predetermined position the position of the casing is based on the received status signal, and an execution means for executing, when the position of the casing is the first position, decorrelation processing for setting a status of the pointer on the screen to a status uncorrelated to the motion signal.

Alternatively, the input apparatus and the control apparatus may be structured as follows. Specifically, the input apparatus includes a casing, an output means for detecting a status of the casing regarding a movement and position of the casing and outputting a status signal indicating the status of the casing, and a transmission means for transmitting the status signal. The control apparatus includes a reception means for receiving the status signal, a coordinate information generation means for generating coordinate information of the pointer on the screen based on a motion signal as a signal on the movement of the casing out of the received status signal, a first judgment means for judging which of a first position as a predetermined position and a second position that is not the predetermined position the position of the casing is based on the received status signal, and an execution means for executing, when the position of the casing is the first position, decorrelation processing for setting a status of the pointer on the screen to a status uncorrelated to the motion signal.

According to the embodiment, there is provided a control method including: detecting a status of a casing of an input apparatus regarding a movement and position of the casing; outputting a status signal indicating the status of the casing; outputting a movement signal for moving the pointer on the screen based on a motion signal as a signal on the movement of the casing out of the status signal that has been output; generating coordinate information of the pointer on the screen based on the movement signal; judging which of a first position as a predetermined position and a second position that is not the predetermined position the position of the casing is based on the status signal; and executing, when the position of the casing is the first position, decorrelation processing for setting a status of the pointer on the screen to a status uncorrelated to the motion signal.

According to another embodiment, there is provided a handheld apparatus controlling a movement of a pointer on a screen, including: a casing; a display section to display the screen; an output means for detecting a status of the casing regarding a movement and position of the casing and outputting a status signal indicating the status of the casing; a movement signal output means for outputting a movement signal for moving the pointer on the screen based on a motion signal as a signal on the movement of the casing out of the status signal that has been output; a first judgment means for judging which of a first position as a predetermined position and a second position that is not the predetermined position the detected position of the casing is; and an execution means for executing, when the detected position of the casing is the first position, decorrelation processing for setting a status of the pointer on the screen to a status uncorrelated to the motion signal.

As described above, according to the embodiment, a movement of the pointer on the screen can be stopped, for example, by a simple operation or without a user being aware of the operation. Accordingly, visual botheration such as the pointer moving unintentionally can be eliminated.

Additional features and advantages are described herein, and will be apparent from, the following Detailed Description and the figures.

BRIEF DESCRIPTION OF THE FIGURES

FIG. 11 is a diagram showing an example of use of the input apparatus 1 in this case.

DETAILED DESCRIPTION

Hereinafter, embodiments of the present invention will be described with reference to the drawings.

Figure 1:
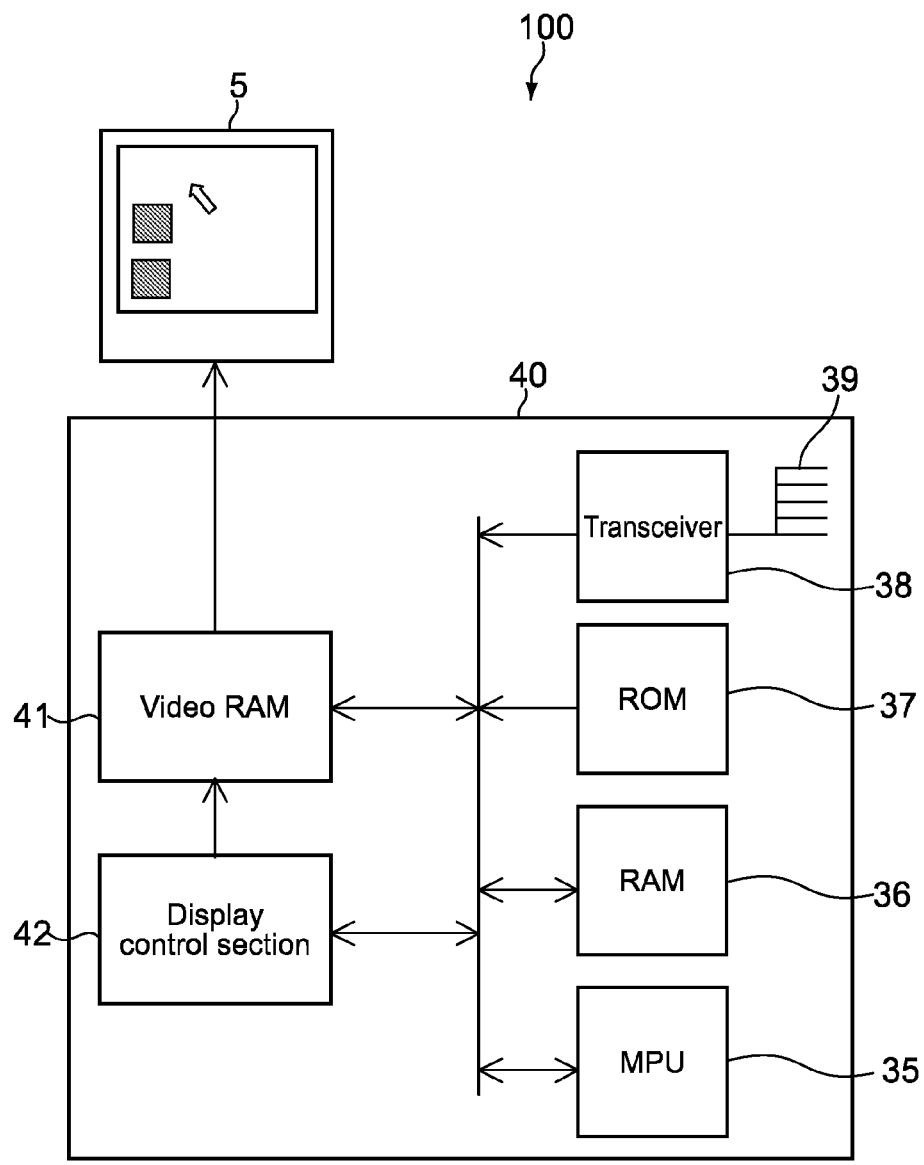
FIG. 1 A diagram showing a control system according to an embodiment of the present invention.
Figure 1:
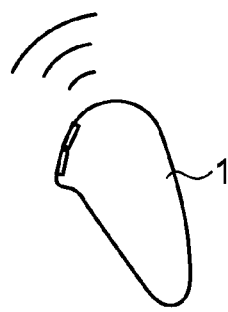

FIG. 1 is a diagram showing a control system according to an embodiment. A control system 100 includes a display apparatus 5, a control apparatus 40, and an input apparatus 1.

Figure 2:
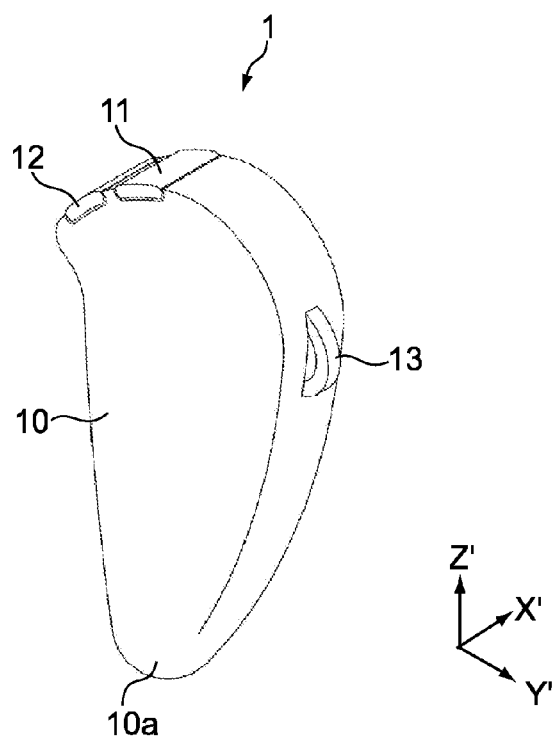
FIG. 2 A perspective diagram showing an input apparatus.

FIG. 2 is a perspective diagram showing the input apparatus 1. The input apparatus 1 is of a size that a user is capable of holding. The input apparatus 1 includes a casing 10 and operation sections including two buttons 11 and 12 provided at an upper portion of the casing 10, a rotary wheel button 13, and the like, for example. The button 11 disposed closer to the center of the upper portion of the casing 10 functions as a left button of a mouse as an input device for a PC, for example, and the button 12 adjacent to the button 11 functions as a right button of a mouse.

For example, a "drag and drop" operation may be executed by moving the input apparatus 1 while pressing the button 11, a file may be opened by double-clicking the button 11, and a screen 3 may be scrolled by the wheel button 13. Locations of the buttons 11 and 12 and the wheel button 13, a content of a command issued, and the like can arbitrarily be changed.

Figure 3:
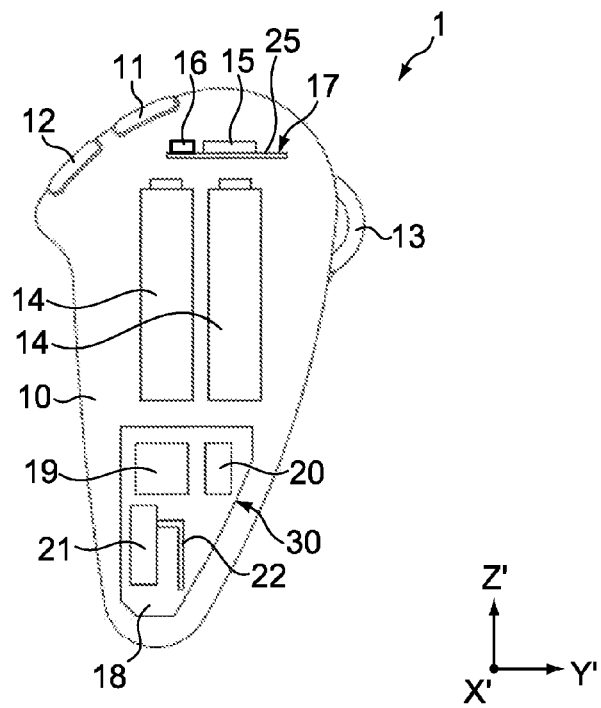
FIG. 3 A diagram schematically showing an internal structure of the input apparatus.
Figure 4:
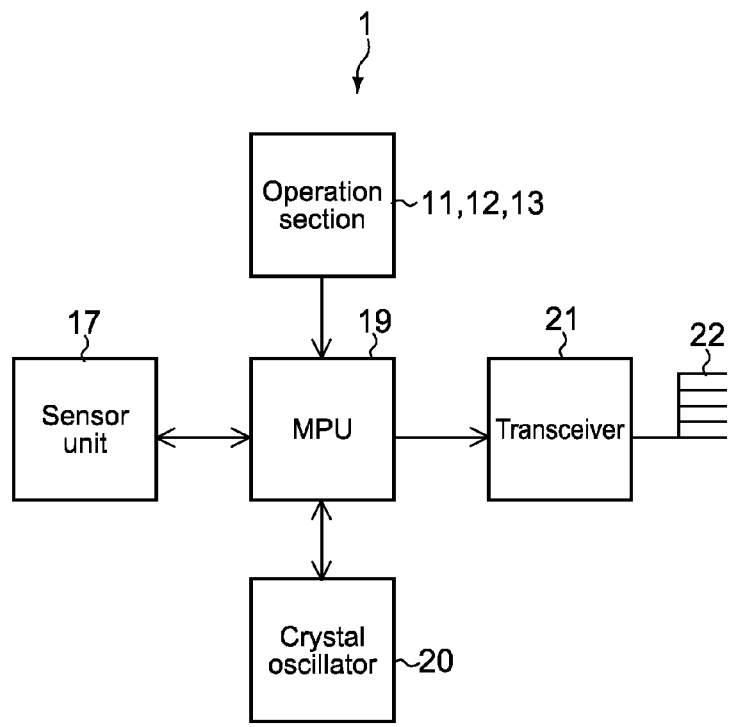
FIG. 4 A block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
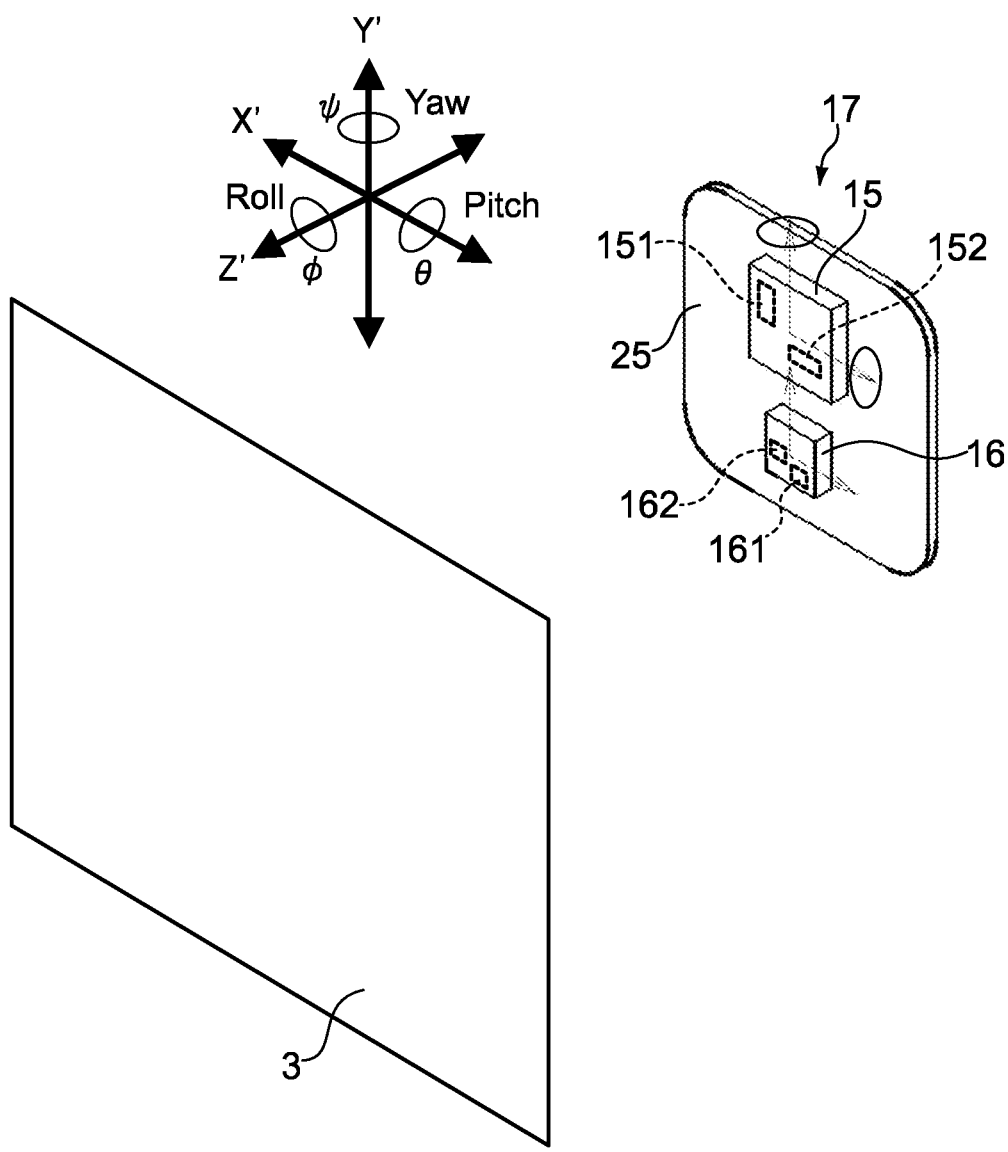
FIG. 8 A perspective diagram showing a sensor unit.

FIG. 8 is a perspective diagram showing the sensor unit 17. The sensor unit 17 functions as a part or all of an output means.

The sensor unit 17 includes an acceleration sensor unit 16 for detecting accelerations in different angles such as along two orthogonal axes (X' axis and Y' axis). Specifically, the acceleration sensor unit 16 includes two sensors, that is, an acceleration sensor 161 for a yaw direction and an acceleration sensor 162 for a pitch direction.

The sensor unit 17 further includes an angular velocity sensor unit 15 for detecting angular accelerations about the two orthogonal axes. Specifically, the angular velocity sensor unit 15 includes two sensors, that is, an angular velocity sensor 151 for a yaw direction and an angular velocity sensor 152 for a pitch direction. The acceleration sensor unit 16 and the angular velocity sensor unit 15 are packaged and mounted on a circuit board 25.

As each of the angular velocity sensors 151 and 152 for the yaw and pitch directions, respectively, a vibration gyro sensor for detecting Coriolis force in proportion to an angular velocity is used. As each of the acceleration sensors 161 and 162 for the X- and Y-axis directions, respectively, any sensor such as a piezoresistive sensor, a piezoelectric sensor, or a capacitance sensor may be used. The angular velocity sensor 151 or 152 is not limited to the vibration gyro sensor, and a rotary top gyro sensor, a ring laser gyro sensor, a gas rate gyro sensor, and the like may also be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. In the specification, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Further, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) direction is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory requisite therefor. The MPU 19 is input with a detection signal from the sensor unit 17, an operation signal from the operation sections, and the like, and executes various kinds of operational processing in order to generate predetermined control signals in response to those input signals. The memory may be provided separate from the MPU 19.

Typically, the sensor unit 17 outputs analog signals. In this case, the MPU 19 includes an A/D (Analog/Digital) converter. Alternatively, the sensor unit 17 may be a unit that includes the A/D converter.

The MPU 19 alone or the MPU 19 and the crystal oscillator 20 constitutes/constitute a processing unit.

The transceiver 21 (transmission means) transmits, as RF radio signals, a control signal generated in the MPU 19 to the control apparatus 40 via the antenna 22. The transceiver 21 is also capable of receiving various signals transmitted from the control apparatus 40.

The crystal oscillator 20 generates clocks and supplies them to the MPU 19. As the batteries 14, dry cell batteries, rechargeable batteries, and the like are used.

The control apparatus 40 includes an MPU 35 (or CPU), a RAM 36, a ROM 37, a video RAM 41, a display control section 42, an antenna 39, and a transceiver 38.

The transceiver 38 receives the control signal transmitted from the input apparatus 1 via the antenna 39 (reception means). The transceiver 38 is also capable of transmitting various predetermined signals to the input apparatus 1. The MPU 35 analyzes the control signal and executes various kinds of operational processing. The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the apparatus dedicated to the input apparatus 1, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like, or an apparatus in which such a display and the control apparatus 40 are integrated.

Figure 5:
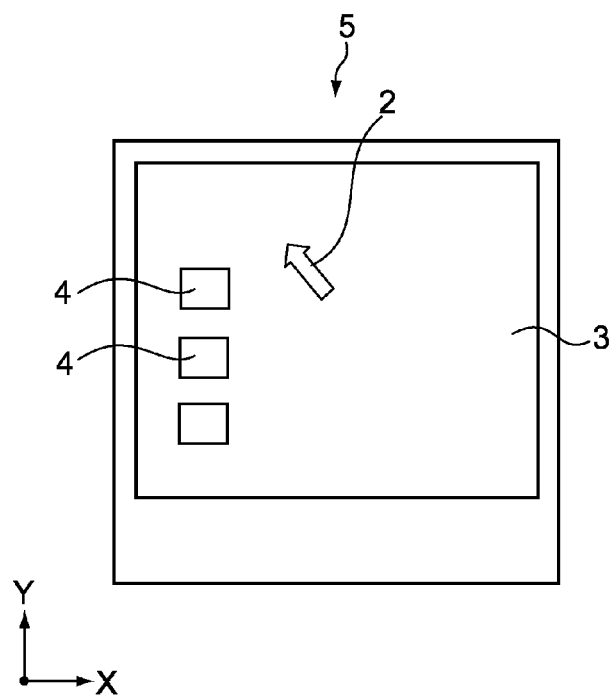
FIG. 5 A diagram showing an example of a screen displayed on a display apparatus.

FIG. 5 is a diagram showing an example of the screen 3 displayed on the display apparatus 5. UIs such as icons 4 and a pointer 2 are displayed on the screen 3. The icons are images on the screen 3 representing functions of programs, program contents, execution commands, file contents, and the like of the computer. It should be noted that on the screen 3, the horizontal direction is referred to as X-axis direction and the vertical direction is referred to as Y-axis direction.

Figure 6:
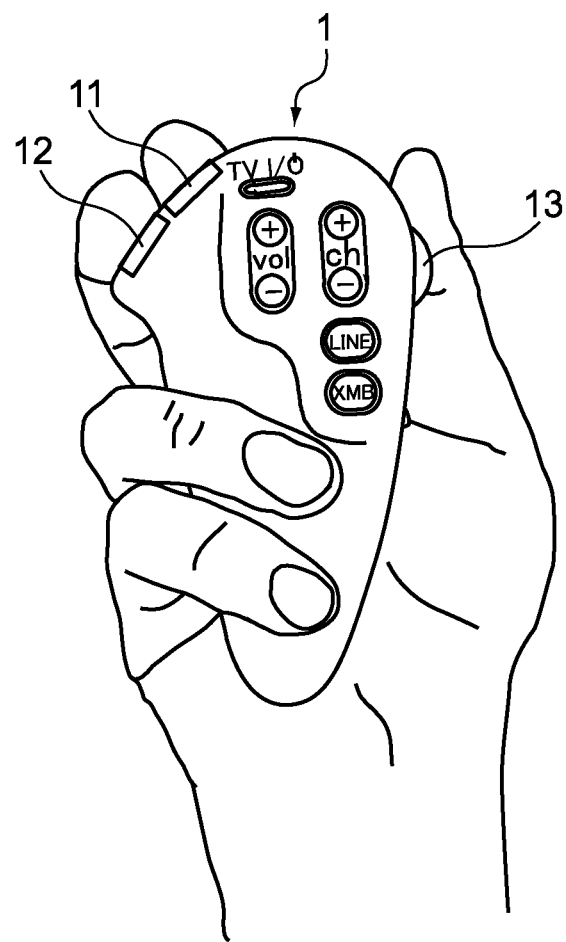
FIG. 6 A diagram showing a state where a user is holding the input apparatus

FIG. 6 is a diagram showing a state where a user is holding the input apparatus 1. As shown in FIG. 6, the input apparatus 1 may include, in addition to the buttons 11, 12, and 13, various operation buttons such as those provided to a remote controller for operating a television or the like and a power supply switch, for example. When the user moves the input apparatus 1 in the air or operates the operation sections while holding the input apparatus 1 as shown in the figure, input information thereof is output to the control apparatus 40, and the control apparatus 40 controls the UI.

Figure 7:
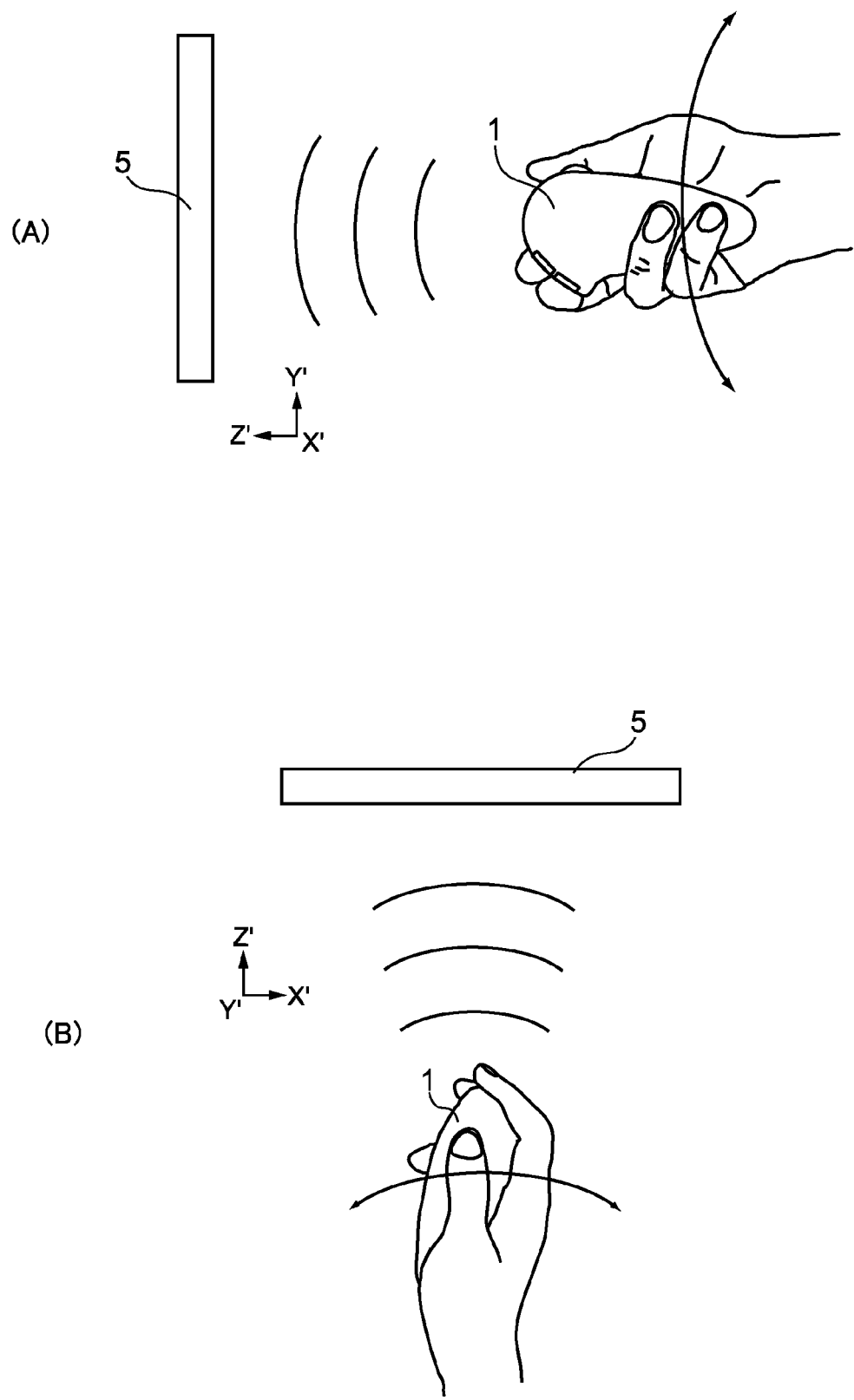
FIG. 7 Explanatory diagrams showing typical examples of ways of moving the input apparatus and ways a pointer moves on the screen accordingly.

Next, a description will be given on typical examples of ways of moving the input apparatus 1 and ways the pointer 2 moves on the screen 3 accordingly. FIG. 7 are explanatory diagrams therefor.

As shown in FIGS. 7(A) and 7(B), the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 of the sensor unit 17 (see FIG. 8) is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7(A) and 7(B) will be referred to as reference position.

As shown in FIG. 7(A), in the reference position, the user swings a wrist or an arm in the vertical direction, that is, the pitch direction. At this time, the acceleration sensor 162 for the Y'-axis direction detects an acceleration $a_y$ in the Y'-axis direction, and the angular velocity sensor 152 for the pitch direction detects an angular velocity $\omega_\theta$ about the X' axis. Based on those detection values, the control apparatus 40 controls display of the pointer 2 so that the pointer 2 moves in the Y-axis direction.

Meanwhile, as shown in FIG. 7(B), in the reference position, the user swings the hand or the arm in the lateral direction, that is, the yaw direction. At this time, the acceleration sensor 161 for the X'-axis direction detects an acceleration $a_x$ in the X'-axis direction, and the angular velocity sensor 151 for the yaw direction detects an angular velocity $\omega_\psi$ about the Y' axis. Based on those detection values, the control apparatus 40 controls display of the pointer 2 so that the pointer 2 moves in the X-axis direction.

Figure 9:
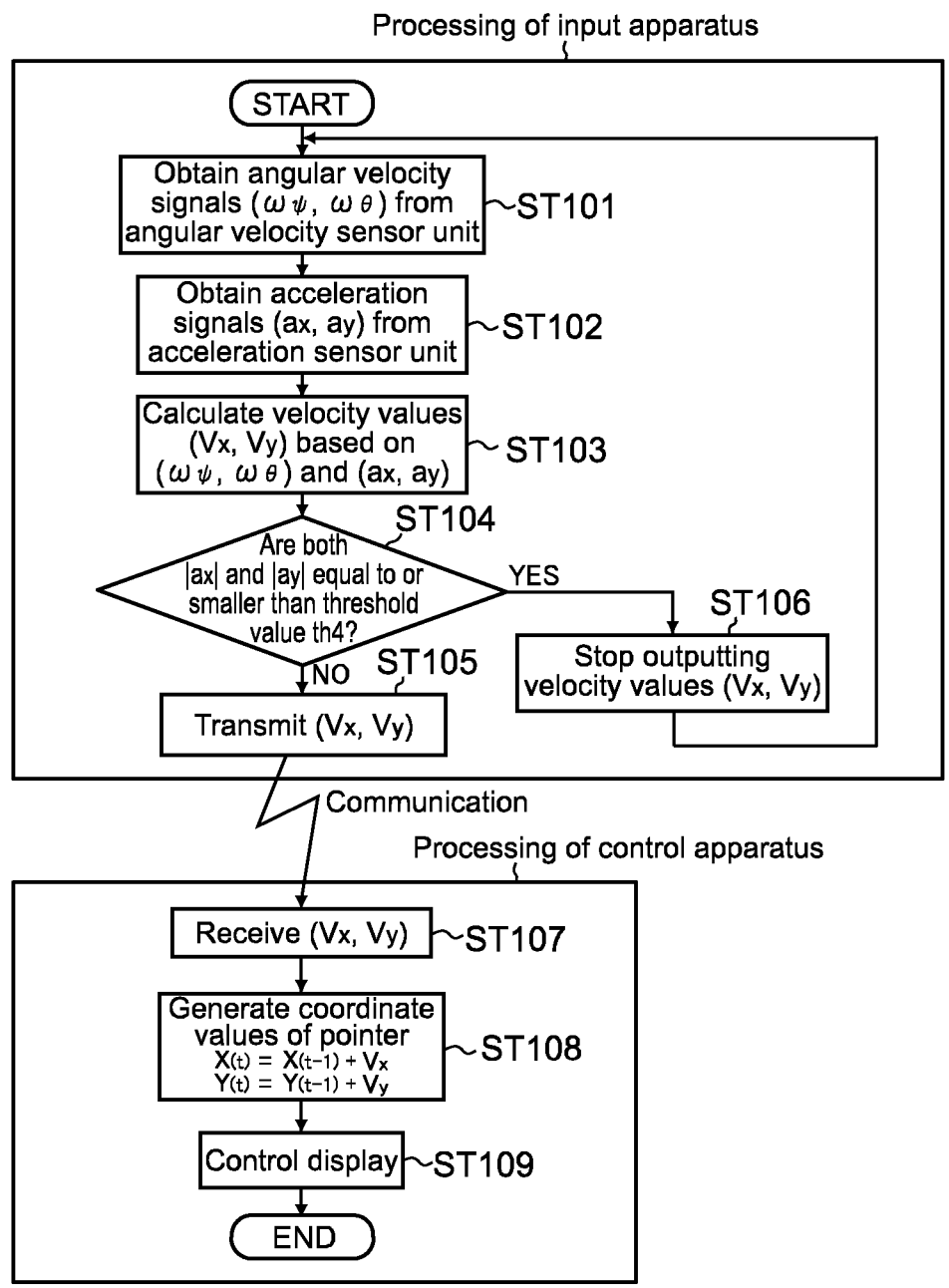
FIG. 9 A flowchart showing an operation of the control system.

Next, an operation of the control system 100 structured as described above will be described. FIG. 9 is a flowchart showing the operation.

Power of the input apparatus 1 is turned on. By the user pressing the power supply switch or the like provided to the input apparatus 1 or the control apparatus 40, for example, the power of the input apparatus 1 is turned on. When the power is turned on, biaxial angular velocity signals are output from the angular velocity sensor unit 15. The MPU 19 obtains a first angular velocity value $\omega_\psi$ and a second angular velocity value $\omega_\theta$ from the biaxial angular velocity signals (Step 101).

Further, upon turning on the power of the input apparatus 1, biaxial acceleration signals are output from the acceleration sensor unit 16. The MPU 19 obtains a first acceleration value $a_x$ and a second acceleration value $a_y$ from the biaxial acceleration signals (Step 102). The signals on the acceleration values are signals corresponding to the position of the input apparatus 1 at a point when the power is turned on (hereinafter, referred to as initial position). The initial position may or may not be the reference position shown in FIG. 7.

It should be noted that the MPU 19 typically carries out Steps 101 and 102 in sync every predetermined clock cycle.

It should be noted that in FIG. 9 and the like, the acceleration signals are obtained by the acceleration sensor unit after the angular velocity signals are obtained by the angular velocity sensor unit. However, the order is not limited thereto, and the angular velocity signals may be obtained after the acceleration signals are obtained, or the acceleration signals and the angular velocity signals may be obtained in parallel (at the same time) (the same holds true for FIGS. 12, 13, and 16 to 20 below).

Based on the acceleration values ($a_x$, $a_y$) and the angular velocity values ($\omega_\psi$, $\omega_\theta$), the MPU 19 calculates velocity values (first velocity value $V_x$, second velocity value $V_y$) by a predetermined operation (Step 103). The first velocity value $V_x$ is a velocity value in a direction along the X axis and the second velocity value $V_y$ is a velocity value in a direction along the Y axis. In this point, at least the sensor unit 17 alone or the MPU 19 and the sensor unit 17 functions/function as an output means for outputting a movement signal for moving the pointer 2 on the screen 3. In other words, the velocity values ($V_x$, $V_y$) or values obtained by appropriately correcting the velocity values ($V_x$, $V_y$) become a movement signal for moving the pointer 2 on the screen 3.

The movement signal will be described below as the velocity values ($V_x$, $V_y$) that correspond to velocities of the pointer 2 on the screen 3. However, the movement signal may instead be values corresponding to acceleration values or values corresponding to displacement amounts of the pointer 2 on the screen 3.

As the method of calculating the velocity values ($V_x$, $V_y$), in this embodiment, the MPU 19 divides the acceleration values ($a_x$, $a_y$) by angular acceleration values ($\Delta\omega_\psi$, $\Delta\omega_\theta$) to thus obtain radius gyrations ($R_\psi$, $R_\theta$) of the movement of the input apparatus 1. In this case, the velocity values ($V_x$, $V_y$) can be calculated by multiplying the radius gyrations ($R_\psi$, $R_\theta$) by the angular velocity values ($\omega_\psi$, $\omega_\theta$). The radius gyrations ($R_\psi$, $R_\theta$) may also be obtained by dividing acceleration change rates ($\Delta a_x$, $\Delta a_y$) by angular acceleration change rates ($\Delta(\Delta\omega_\psi)$, $\Delta(\Delta\omega_\theta)$).

By calculating the velocity values by the calculation method described above, an operational feeling of the input apparatus 1 that matches an intuition of the user can be obtained, and moreover, the movement of the pointer 2 on the screen 3 also accurately matches the movement of the input apparatus 1.

It should be noted that the velocity values ($V_x$, $V_y$) do not always need to be calculated by the calculation method above. For example, the MPU 19 may calculate the velocity values by, for example, integrating the acceleration values ($a_x$, $a_y$) while using the angular velocity values ($\omega_\psi$, $\omega_\theta$) as an adjunct for the integration operation. Alternatively, it is also possible for the velocity values ($V_x$, $V_y$) to be calculated by simply integrating the acceleration values ($a_x$, $a_y$). Alternatively, the detected angular velocity values ($\omega_\psi$, $\omega_\theta$) may be used as they are as the velocity values ($V_x$, $V_y$) of the casing. It is also possible to obtain angular acceleration values ($\Delta\omega_\psi$, $\Delta\omega_\theta$) by temporally differentiating the detected angular velocity values ($\omega_\psi$, $\omega_\theta$), and use them as the acceleration values of the casing.

The MPU 19 judges whether absolute values of the acceleration values ($|a_x|$, $|a_y|$) are both equal to or smaller than a threshold value (hereinafter, referred to as threshold value th4 for convenience) (first judgment means) (Step 104). When both $|a_x|$ and $|a_y|$ are not equal to or smaller than the threshold value th4, the MPU 19 transmits the velocity values ($V_x$, $V_y$) to the control apparatus 40 via the transceiver 21 (Step 105). Otherwise, the MPU 19 stops outputting (transmitting) the velocity values ($V_x$, $V_y$) (Step 106). In Step 106, the MPU 19 may stop calculating the velocity values ($V_x$, $V_y$). In Step 106, the MPU 19 typically functions as an execution means for decorrelation processing.

By the stop of the transmission or calculation of the velocity values ($V_x$, $V_y$), the movement of the pointer 2 on the screen 3 stops.

Figure 10:
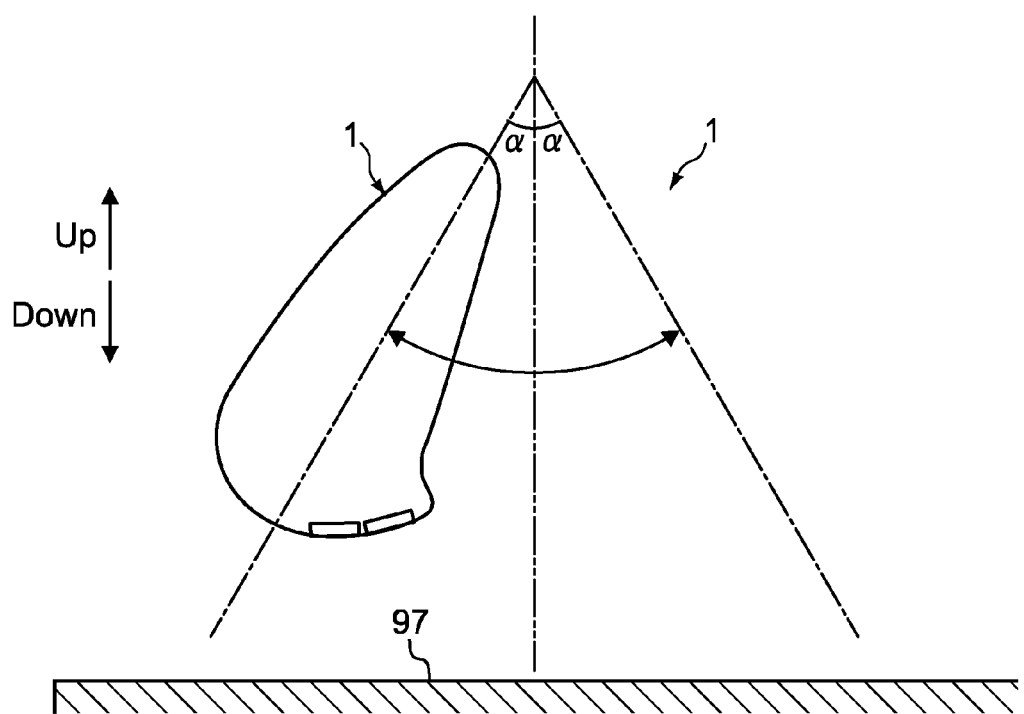
FIG. 10 A diagram for illustrating a relationship between a position of (a casing of) the input apparatus and a threshold value.

The threshold value th4 can be set arbitrarily. FIG. 10 is a diagram for illustrating a relationship between a position of (the casing of) the input apparatus and the threshold value th4. As shown in FIG. 10, typically, a time when the position of the casing 10 of the input apparatus 1 falls within an angle range an angle ±α from a line that is perpendicular to a ground (horizontal plane) 97 (first position) is a time when the absolute values become equal to or smaller than the threshold value th4.

The angle α only needs to be set to be about 10° to 50° or 20° to 40°, but is not limited to those ranges.

The input apparatus 1 may include an adjustment means for adjusting the angle α. As the adjustment means, a mechanical switch such as a DIP switch, a static switch, a piezoelectric switch, or the like only needs to be provided to the input apparatus. In this case, the number of adjustment steps may be two or more. Alternatively, the control apparatus 40 may include software including GUI as the adjustment means. Accordingly, the control apparatus 40 transmits, after adjusting the angle α, information on the adjustment result to the input apparatus 1, and the input apparatus 1 stores the information.

The MPU 35 of the control apparatus 40 receives information on the velocity values ($V_x$, $V_y$) via the antenna 39 and the transceiver 38 (Step 107). The input apparatus 1 outputs the velocity values ($V_x$, $V_y$) every predetermined clocks, that is, per unit time, so the control apparatus 40 can receive this and obtain displacement amounts in the X- and Y-axis directions per unit time.

The MPU 35 generates coordinate values (X(t), Y(t)) of the pointer 2 on the screen 3 that correspond to the obtained displacement amounts in the X- and Y-axis directions per unit time by Equations (1) and (2) below (Step 108). Based on the generated coordinate values, the MPU 35 controls display so that the pointer 2 moves on the screen 3 (Step 109) (coordinate information generation means).

$$X(t)=X(t-1)+V_x \quad (1)$$

$$Y(t)=Y(t-1)+V_y \quad (2)$$

According to this embodiment, when the position of the casing 10 is within an angle ±α range as shown in FIG. 10, the calculation or transmission of the velocity values is stopped and the movement of the pointer 2 is stopped. In other words, when the position of the input apparatus 1 is within the angle ±α range, the movement of the input apparatus 1 and a status of the pointer on the screen 3 are uncorrelated (decorrelation processing). Therefore, with the angle ±α, the pointer 2 can be prevented from moving on the screen 3 in accordance with the movement of the input apparatus 1 unintended by the user. Moreover, since the user does not need to perform an operation of consciously pressing a button or the like for stopping the movement of the pointer 2 as in the related art, operations become easier.

In this embodiment, when performing a pointing operation, the user aims the input apparatus 1 at the screen 3 as shown in FIG. 7. When not performing the pointing operation, (the buttons 11 and 12 side of) the input apparatus 1 only needs to be directed downward.

Alternatively, when not performing the pointing operation, the user may direct (the buttons 11 and 12 side of) the input apparatus 1 upward. Also in this case, the movement of the pointing stops when both |$a_x$| and |$a_y$| become the threshold value th4.

The decorrelation processing is not limited to the processing of stopping the movement of the pointer 2. For example, the MPU 19 can carry out any one of the following processing examples (1) to (4).

(1) Processing of outputting a signal for setting a movement amount of the pointer 2 on the screen 3 to 0.

(2) Processing of outputting a signal for hiding the pointer 2.

(3) Processing of outputting a movement signal with which the movement amount of the pointer 2 sufficiently exceeds a size range of the screen 3.

(4) Processing of moving the pointer 2 to, for example, an end portion (or predetermined coordinate position) of the screen 3 at a constant velocity or by given movement irrespective of the movement of the input apparatus 1.

Figure 11:
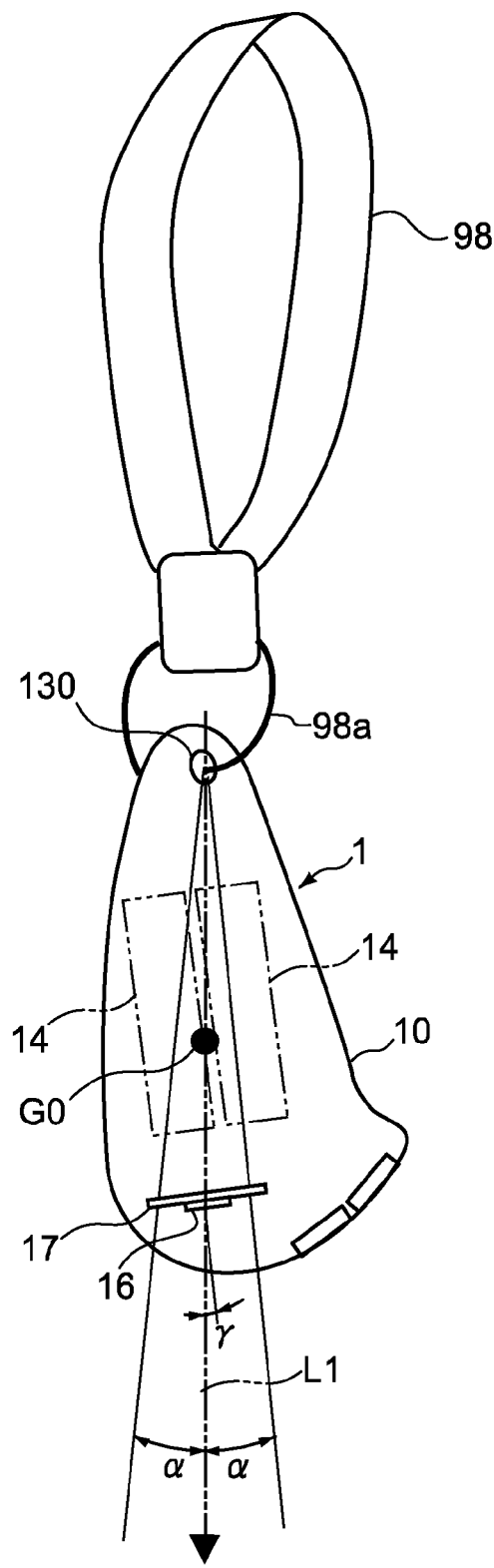
FIG. 11 There is the following method in addition to a method of directing the input apparatus 1 downward or upward.

When the user is not performing a pointing operation, there is also the following method in addition to the method of directing the input apparatus 1 downward or upward. FIG. 11 is a diagram showing an example of use of the input apparatus 1 in this case.

For example, a mounting section 130 to which a strap 98 as a holder is attached is provided at an end portion of the casing 10. The mounting section 130 is, for example, a hole penetrating the casing 10. By inserting a string portion 98a of the strap 98 through the hole, the strap 98 is attached to the mounting section 130. For example, the user hangs the strap 98 from a neck, a wrist, or the like. Regarding a length of the strap 98, if a strap longer than that shown in FIG. 11 is used, the user can hang the strap 98 from the neck.

In this case, when a center of gravity G0 of the input apparatus 1 is below the mounting section 130 and the position of the casing 10 is a predetermined position, that is, tilted within a predetermined angle range (within angle ±α range above) from an axis along a gravity direction, a virtual line H that connects the mounting section 130 and the center of gravity G0 passes inside the angle ±α range. The mounting section 130 is set to the casing 10 at a position determined as described above.

As described above, in this embodiment, a positional range of the angle α centering on the position at which the virtual line L1 that connects the mounting section 130 and the center of gravity G0 of the input apparatus 1 coincides with the gravity direction is set as the predetermined position. In the example of FIG. 11, the angle α is expressed by a tilt angle of the input apparatus 1 about the mounting section 130. In addition, in this embodiment, the sensor unit 17 is provided inside the casing 10 such that an angle γ formed between a direction of the axis (Z' axis) orthogonal to the detection axes of the acceleration sensors 16 (161, 162) and the gravity direction becomes smaller than the predetermined angle (γ<α), though not limited thereto.

Accordingly, when the user holds the input apparatus 1 via the strap 98, for example, the position of the casing 10 automatically tilts within the angle ±α range due to a weight of the input apparatus 1 itself. For example, when performing a pointing operation in a presentation, the user moves the input apparatus 1 while holding the input apparatus 1 attached to the strap that is hung from the neck. By the user releasing the input apparatus 1, the position of the input apparatus 1 automatically tilts within the angle ±α range and the movement of the pointer 2 thus stops, which is convenient.

In addition to the strap, a key ring may be used as the holder, for example.

Figure 12:
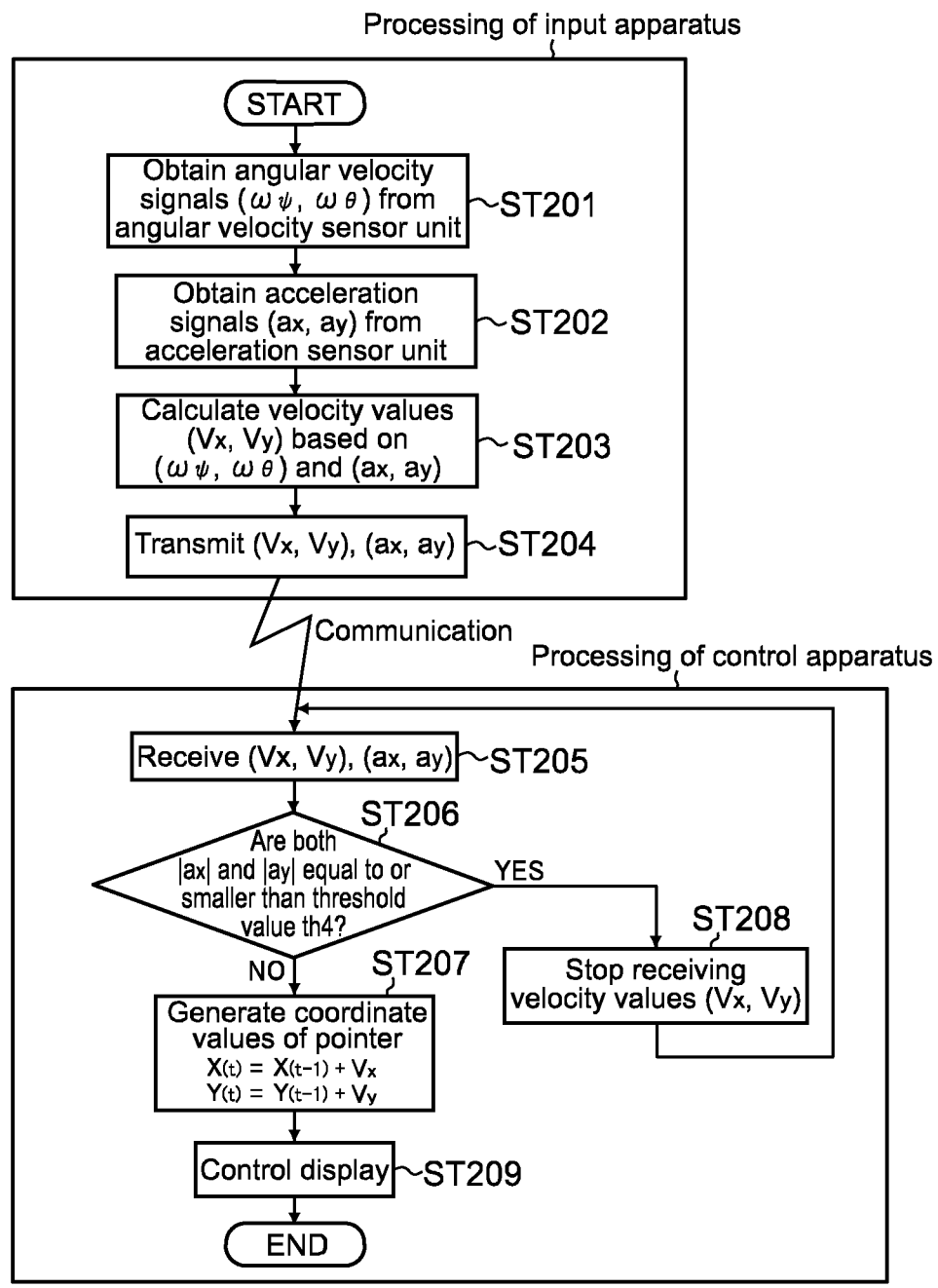
FIG. 12 is a flowchart according to another embodiment of the control apparatus 100 in a case where a control apparatus 40 carries out main judgment processing.

FIG. 12 is a flowchart according to another embodiment of the control system 100. In FIG. 9, the input apparatus 1 has carried out the judgment processing in Step 104. However, in the embodiment shown in FIG. 12, the control apparatus 40 carries out such judgment processing.

Steps 201 to 203 are the same as Steps 101 to 103. In Step 204, the MPU 19 transmits the velocity values ($V_x$, $V_y$) and the acceleration values ($a_x$, $a_y$) obtained in Step 202.

The MPU 35 of the control apparatus 40 receives the velocity values ($V_x$, $V_y$) and the acceleration values ($a_x$, $a_y$) (Step 205). The MPU 35 carries out the judgment processing in the same manner as in Step 104 of FIG. 9 (Step 206). When both |$a_x$| and |$a_y$| are not equal to or smaller than the threshold value th4, the MPU 35 executes processes the same as those of Steps 108 and 109 in FIG. 9. Otherwise, the MPU 35 stops receiving the velocity values ($V_x$, $V_y$) (Step 208). Accordingly, the movement of the pointer 2 on the screen 3 is stopped.

It is also possible for the MPU 35 to stop generating the coordinate values of the pointer 2 in Step 208.

Figure 13:
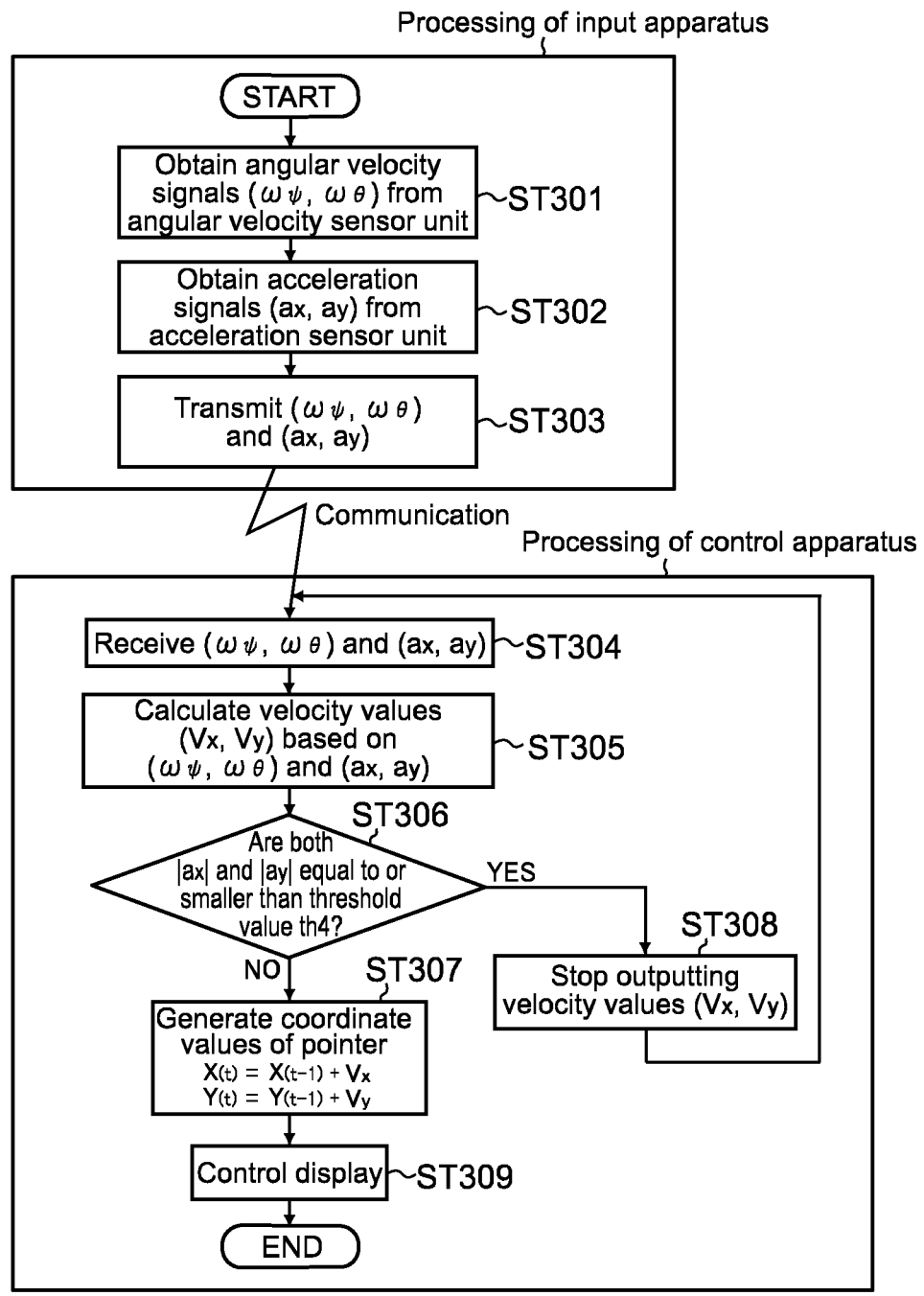
FIG. 13 A flowchart showing a modified example of the processing shown in FIG. 12.

In addition to the processing shown in FIG. 12, the MPU 19 of the input apparatus 1 may transmit the acceleration values ($a_x$, $a_y$) and the angular velocity values ($\omega_\psi$, $\omega_\theta$) to the control apparatus 40 after Step 302 as shown in FIG. 13 (Step 303). The MPU 35 of the control apparatus 40 receives the acceleration values ($a_x$, $a_y$) and the angular velocity values ($\omega_\psi$, $\omega_\theta$) (Step 304) and calculates the velocity values ($V_x$, $V_y$) based on those values (Step 306). The MPU 35 only needs to execute processes that are substantially the same as those of Steps 206 to 209 shown in FIG. 12 (Steps 306 to 309).

In the judgment processing of Steps 104, 206, and 306, the judgment has been made on whether both $|a_x|$ and $|a_y|$ are equal to or smaller than the threshold value th4. However, the present invention is not limited thereto, and a judgment may be made on whether an operational value obtained based on $|a_x|$ and $|a_y|$ is equal to or smaller than a threshold value.

The operational value is a value obtained by an addition, multiplication, or vector operation, or by other operational expressions. An expression of the vector operation is, for example, $(|a_x|^2 + |a_y|^2)^{1/2}$. Also in these cases, threshold values are set to appropriate values.

Figure 14:
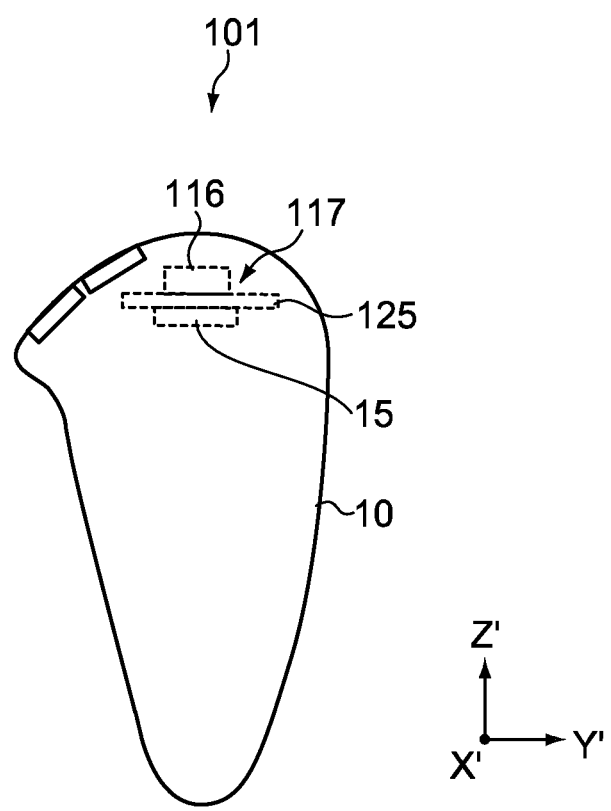
FIG. 14 A schematic diagram showing an input apparatus according to another embodiment.

FIG. 14 is a schematic diagram showing an input apparatus according to another embodiment. In descriptions below, components, functions, and the like that are the same as those of the input apparatus 1 according to the embodiment shown in FIGS. 1 to 4 and the like will be simplified or omitted, and different points will mainly be described.

An acceleration sensor unit 116 included in a sensor unit 117 of an input apparatus 101 shown in FIG. 14 is a triaxial acceleration sensor unit that detects an acceleration $a_z$ on the Z' axis in addition to accelerations on the X' axis and the Y' axis.

It should be noted that in this embodiment, the acceleration sensor unit 116 and the angular velocity sensor unit 15 are respectively mounted on one surface of a circuit board 125 and a surface opposite thereto. However, those may be mounted only on one surface of the circuit board 125 as shown in FIG. 8. By mounting the acceleration sensor unit 116 and the angular velocity sensor unit 15 on respective surfaces of the circuit board 125, the circuit board 125 can be made small.

Figure 15:
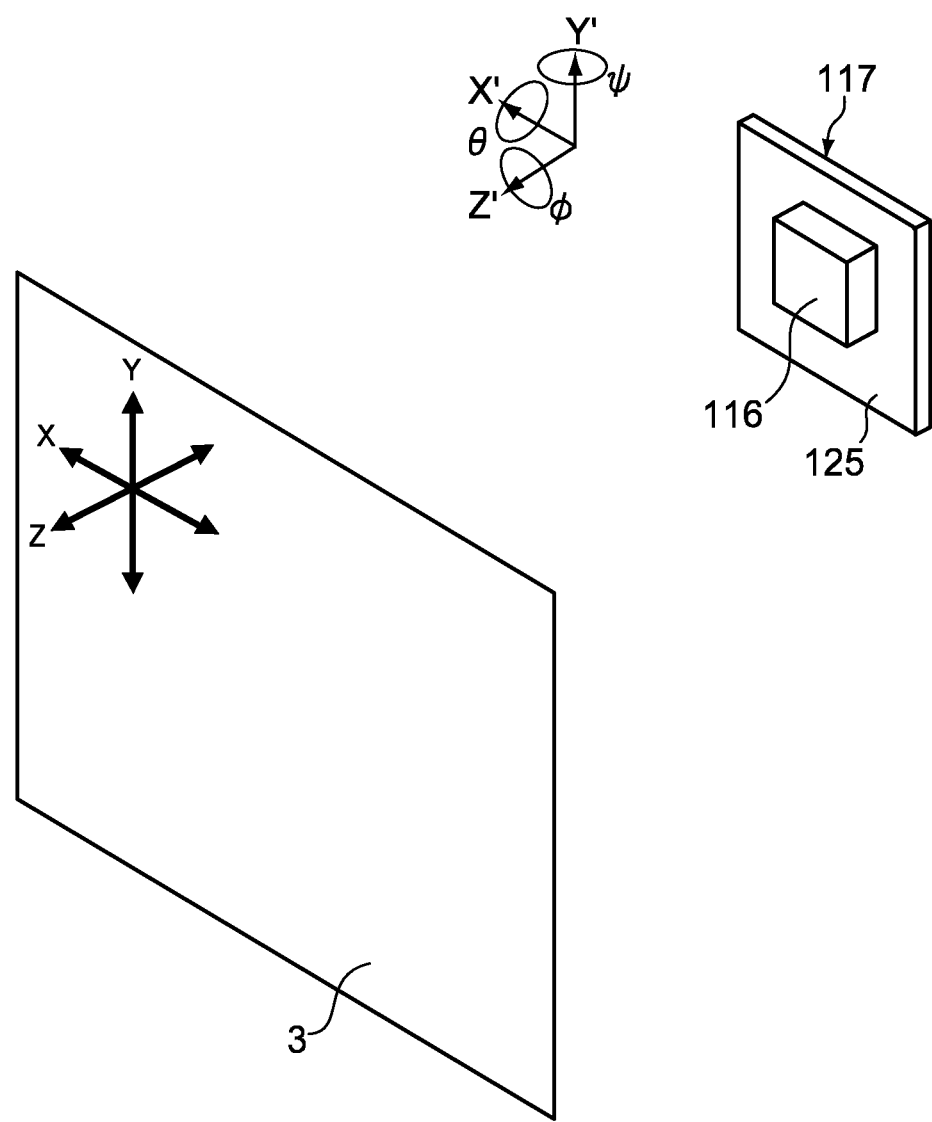
FIG. 15 A diagram showing a position of a sensor unit in a case where the input apparatus shown in FIG. 14 is used in a reference position shown in FIG. 7.

FIG. 15 is a diagram showing a position of the sensor unit 117 in a case where the input apparatus 101 is used in the reference position as shown in FIG. 7. As shown in the figure, in the reference position, the Z'-axis direction is a direction substantially perpendicular to the screen 3.

Figure 16:
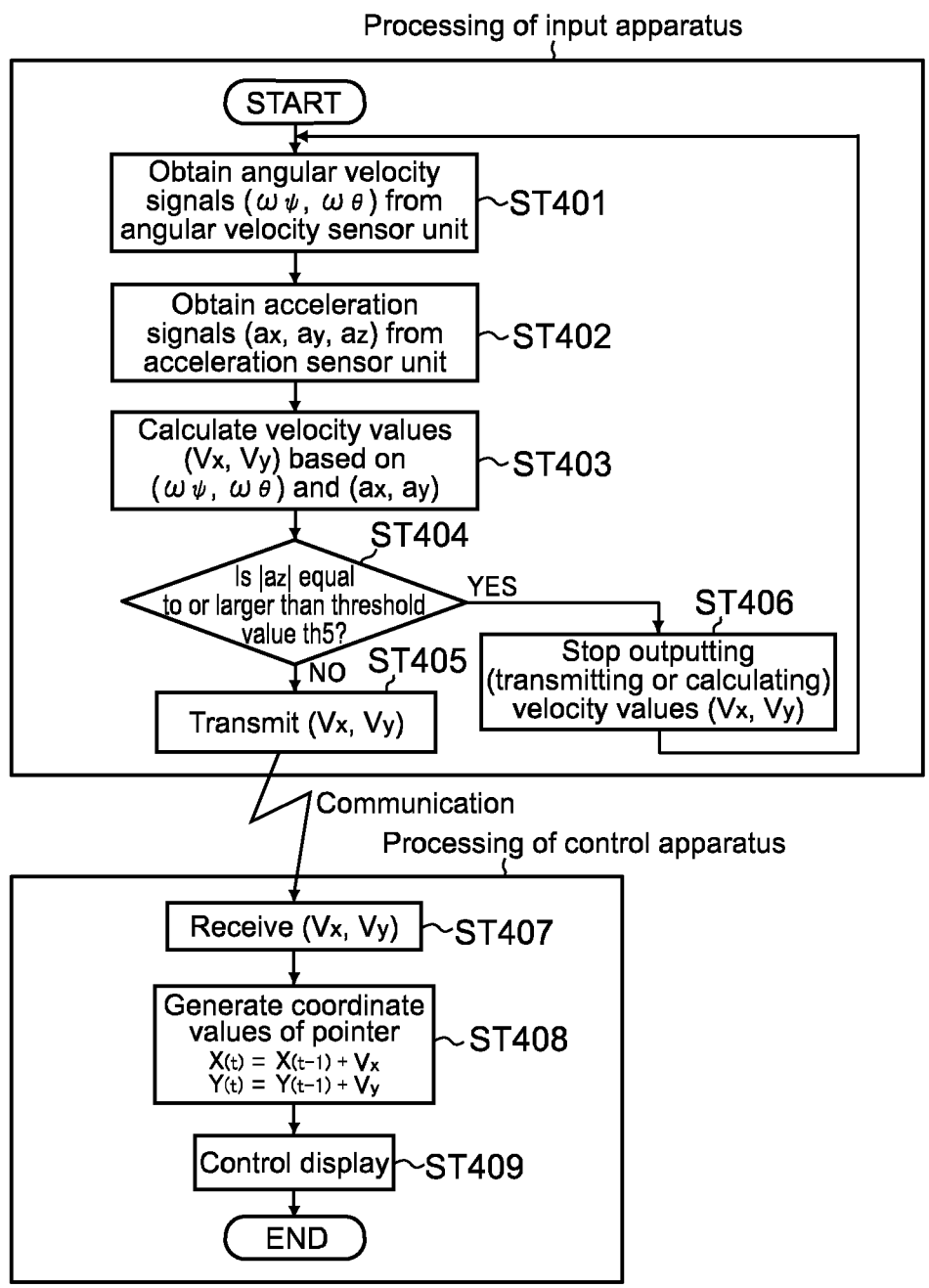
FIG. 16 A flowchart showing an operation of the control system in a case where the input apparatus shown in FIG. 14 is used.

FIG. 16 is a flowchart showing an operation of the control system 100 in the case of where the input apparatus 101 is used.

Processes of Steps 401 to 403 are substantially the same as those of Steps 101 to 103 shown in FIG. 9, provided that the MPU 19 obtains triaxial acceleration values ($a_x$, $a_y$, $a_z$) in Step 402.

In Step 404, the MPU 19 judges whether an absolute value $|a_z|$ of the acceleration value $a_z$ on the Z' axis is equal to or larger than a threshold value th5. The threshold value th5 only needs to be set as appropriate in the same manner as the threshold value th4. When $|a_z|$ is not equal to or larger than the threshold value th5, the MPU 19 transmits the velocity values ($V_x$, $V_y$) (Step 405). Otherwise, the MPU 19 stops the output (Step 406). In other words, it is only necessary to monitor $|a_z|$ since $|a_z|$ increases when the input apparatus 1 is directed downward or upward from the reference position by a tilt of the angle ±α (see FIG. 10).

Processes of Steps 407 to 409 are the same as those of Steps 107 to 109.

As described above, this embodiment bears the same operational effect as the above embodiment. Further, because the MPU 19 can carry out the judgment processing by monitoring only $|a_z|$ and not $|a_x|$ and $|a_y|$, an operational amount can be reduced.

It should be noted that in addition to the judgment processing of Step 404, the acceleration value $a_z$ may also be used in a process of calculating the velocity values ($V_x$, $V_y$) of the input apparatus 1.

Also in the flowchart shown in FIG. 16, the control apparatus 40 may carry out the judgment processing and calculation of the velocity values in the same manner as the processing shown in FIG. 12 or 13.

Figure 17:
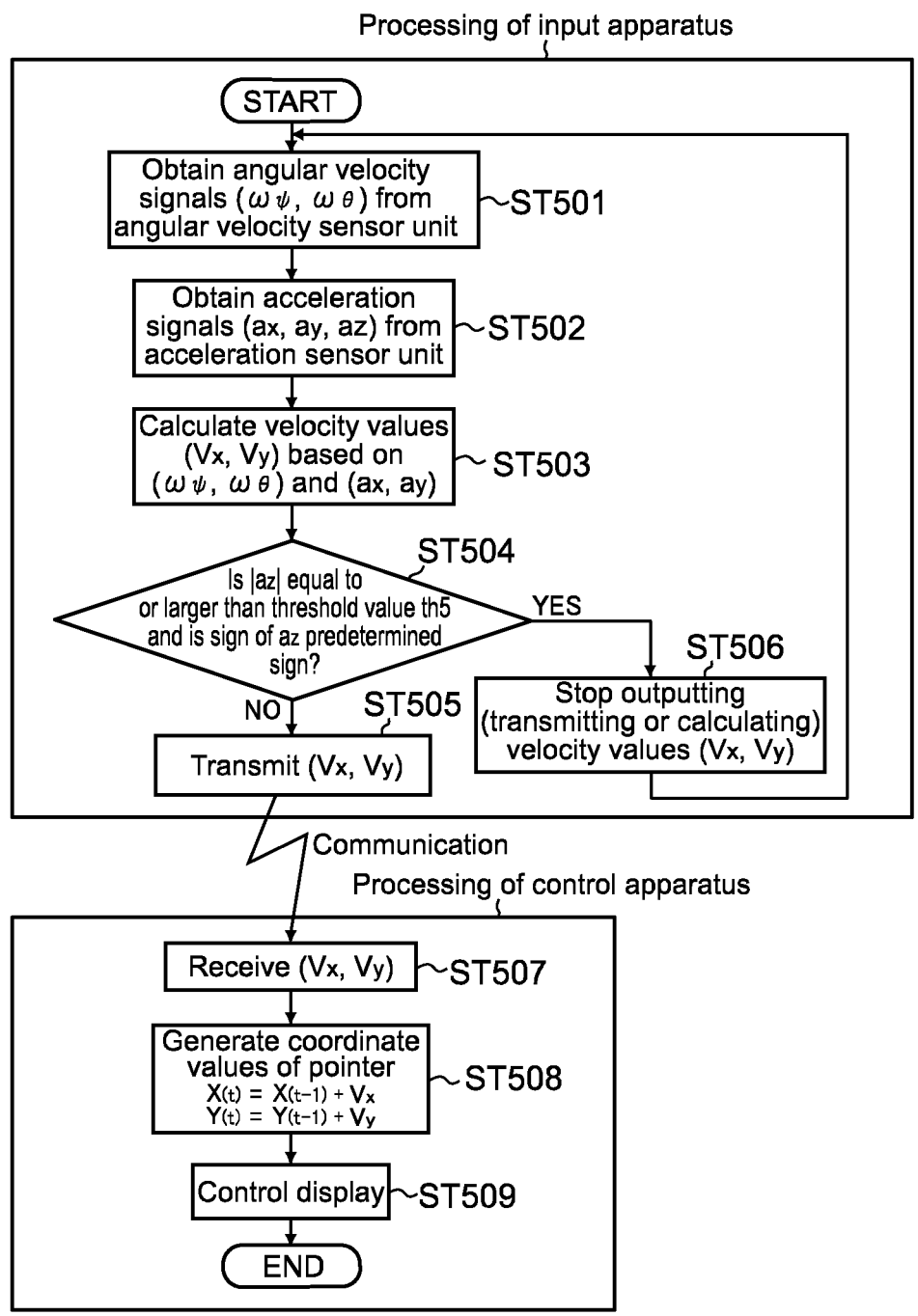
FIG. 17 A flowchart showing a modified example of the processing shown in FIG. 16 in the case where the input apparatus shown in FIG. 14 is used.

FIG. 17 is a flowchart showing a modified example of the processing shown in FIG. 16 in the case where the input apparatus 101 shown in FIG. 14 is used.

In the processing shown in FIG. 17, a process of Step 504 differs from that of Step 404. In Step 504, the MPU 19 judges whether $|a_z|$ is equal to or larger than the threshold value th5 and whether a sign of $a_z$ is a predetermined positive or negative sign. In this case, the MPU 19 practically functions as a first judgment section and a second judgment section. By judging the sign of $a_z$, the MPU 19 can recognize that the position of (the buttons 11 and 12 side of) the input apparatus 1 is within a downward angle ±α range (see FIG. 10) or an upward angle ±α range. For example, when the position of the input apparatus 1 is within the downward angle ±α range, the MPU 19 only needs to advance to Step 506.

Alternatively, it is also possible for the MPU 19 to advance to Step 506 when the position of the input apparatus 1 is within the upward angle ±α range in Step 504.

Also in the flowchart shown in FIG. 17, the control apparatus 40 may carry out the judgment processing and calculation of the velocity values in the same manner as the processing of FIG. 12 or 13.

Figure 18:
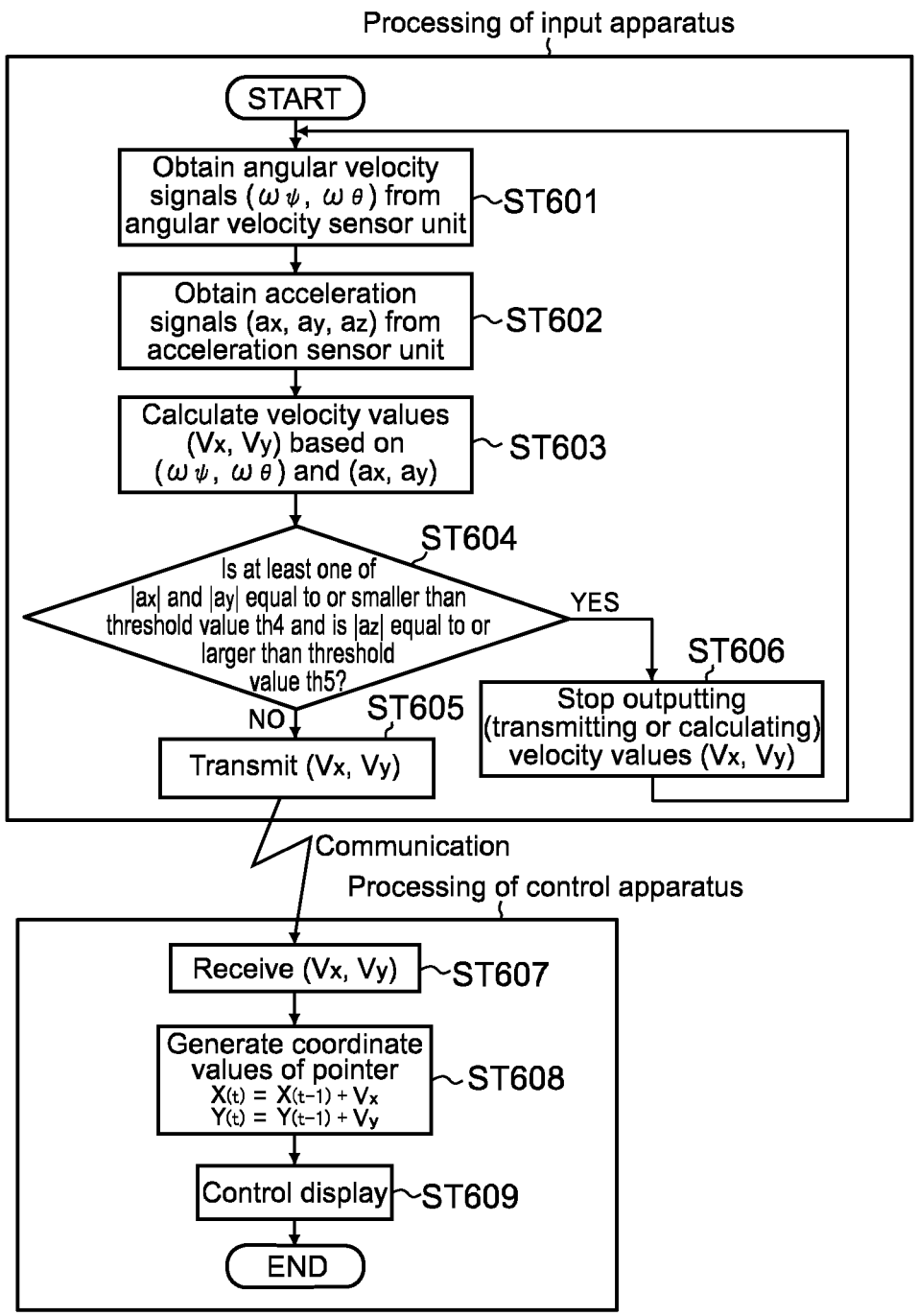
FIG. 18 A flowchart showing a modified example of the processing shown in FIGS. 16 and 17 in the case where the input apparatus shown in FIG. 14 is used.

FIG. 18 is a flowchart showing a modified example of the processing shown in FIGS. 16 and 17 in the case where the input apparatus 101 shown in FIG. 14 is used.

In the processing shown in FIG. 18, a process of Step 604 differs from those of Steps 404 and 504. In Step 604, the MPU 19 judges whether at least one of $|a_x|$ and $|a_y|$ is equal to or smaller than the threshold value th4 and $|a_z|$ is equal to or larger than the threshold value th5. When judged YES, the MPU 19 advances to Step 606, and when judged NO, advances to Step 605.

Also in the flowchart shown in FIG. 18, the control apparatus 40 may carry out the judgment processing and calculation of the velocity values in the same manner as the processing of FIG. 12 or 13.

In addition to the processing described with reference to FIGS. 16 to 18, the MPU 19 may execute judgment processing for decorrelation processing based on a resultant vector operational value obtained based on all acceleration values (vectors) of $a_x$, $a_y$, and $a_z$, for example. In other words, the MPU 19 executes the decorrelation processing when the resultant vector operational value is within a predetermined numerical value range that corresponds to the position of the casing 10 as shown in FIG. 10, for example. In this case, the resultant vector operational value is a value that indicates an absolute direction and level within a 3D space. Accordingly, accuracy of the judgment processing improves although the operational amount of the MPU 19 increases.

Figure 19:
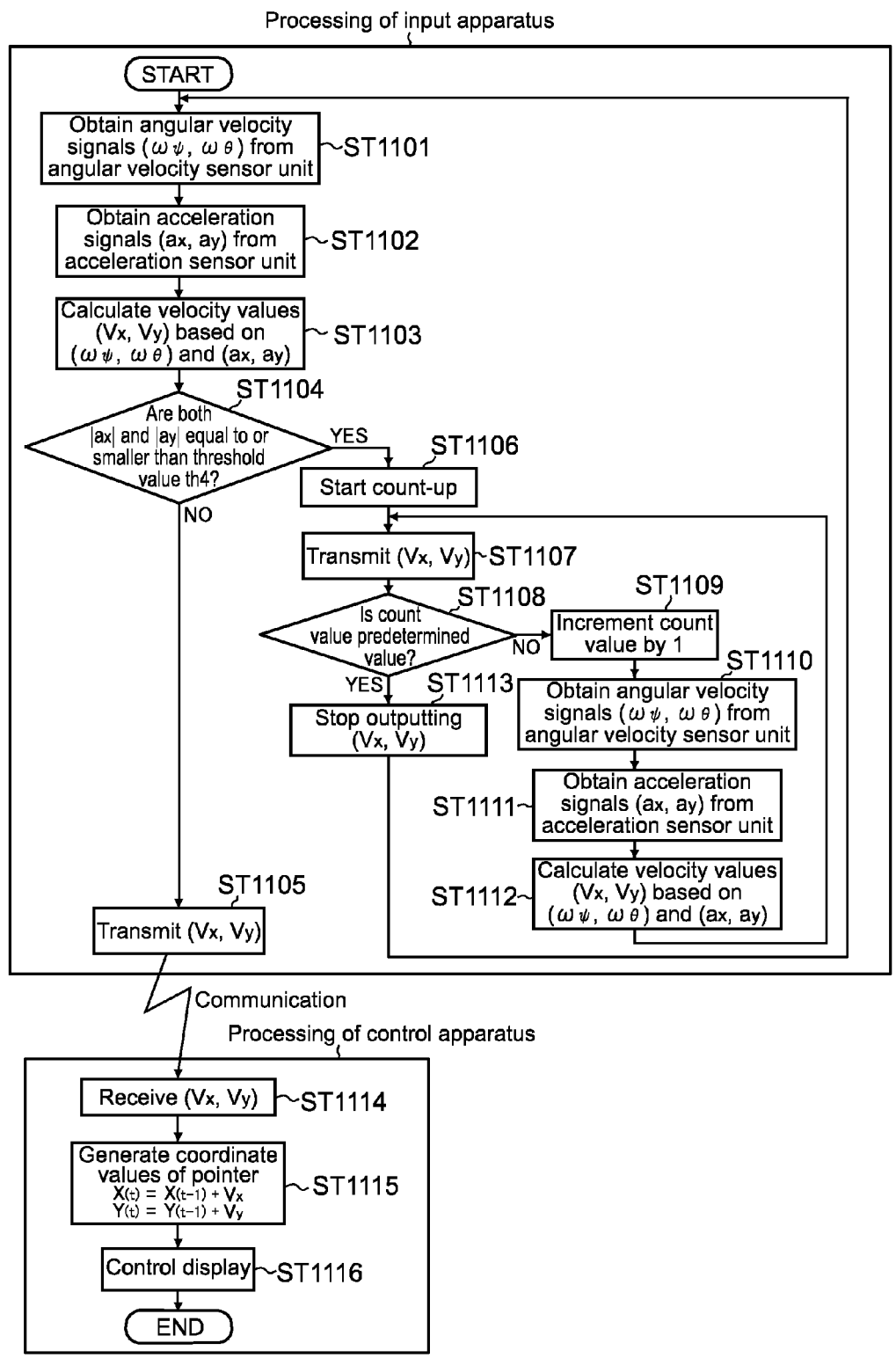
FIG. 19 A flowchart showing an operation of the control system according to still another embodiment.

FIG. 19 is a flowchart showing an operation of the control system 100 according to still another embodiment. In this embodiment, a case where the biaxial acceleration sensor unit 16 and the biaxial angular velocity sensor unit 15 are used will be described.

Processes of Steps 1101 to 1104 are the same as those of Steps 101 to 104 shown in FIG. 9.

When both $|a_x|$ and $|a_y|$ are equal to or smaller than the threshold value th4 in Step 1104, the MPU 19 activates a timer (not shown) to start a count-up (Step 1106), and transmits the velocity values ($V_x$, $V_y$) (Step 1107).

The MPU 19 judges whether a count value matches a predetermined value (Step 1108). The MPU 19 only needs to store the predetermined numerical value of the counter (timer) in a memory or the like in advance. When the values match in Step 1108, that is, when a predetermined time period has elapsed since the start of the count-up, the MPU 19 stops outputting (transmitting or calculating) the velocity values (Step 1113). Accordingly, the movement of the pointer 2 on the screen 3 stops.

When the count value and the predetermined value do not match, that is, when the predetermined time period has not elapsed since the start of the count-up, the MPU 19 increments the count value by 1 (Step 1109). Then, the MPU 19 carries out processes as in Steps 1101 to 1103 (Step 1110 to 1112) and returns to Step 1107.

When both $|a_x|$ and $|a_y|$ exceed the threshold value th4 in Step 1104, the MPU 19 transmits the velocity values (Step 1105). Processes of Steps 1114 to 1116 are the same as those of Steps 107 to 109 shown in FIG. 9.

As described above, whether a state where the position of the input apparatus 1 is the predetermined position (e.g., within angle ±α range shown in FIG. 10) is maintained for a predetermined time period is monitored. In this case, the MPU 19 practically functions as a time judgment means. In other words, the MPU 19 practically functions as a count means for judging whether the state where the position of the input apparatus 1 is the predetermined position continues for a predetermined count (count of count value).

The predetermined time period is typically 0.3 sec to 1 sec, but is not limited to this range.

The embodiment as described above bears the following merits. For example, there may be a case where, even when the user is moving the input apparatus 1 to perform a pointing operation, a position thereof is accidentally directed downward (and/or upward) as shown in FIG. 10. However, in this embodiment, the decorrelation processing is not executed when the position shown in FIG. 10 is not maintained for a predetermined time period. Accordingly, accuracy in detecting whether the movement of the pointer is a movement intended by the user can be improved.

Alternatively, without being limited to the accidental case, in this embodiment, accuracy in detecting whether the movement of the pointer is a movement intended by the user can be improved also when the threshold-value judgment of the acceleration values of the input apparatus 1 as in Step 1104 is carried out.

Also in the flowchart shown in FIG. 19, the control apparatus 40 may carry out the judgment processing and calculation of the velocity values in the same manner as the processing of FIG. 12 or 13. In this case, the control apparatus 40 mainly executes Steps 1104 (or 1103), 1106 to 1112, 1115, and 1116.

Alternatively, the processing as shown in FIGS. 16 to 18 carried out in the case where the triaxial acceleration sensor unit 116 is used may be incorporated in the flowchart shown in FIG. 19. In this case, the process of Step 404, 504, or 604 is executed instead of Step 1104.

Figure 20:
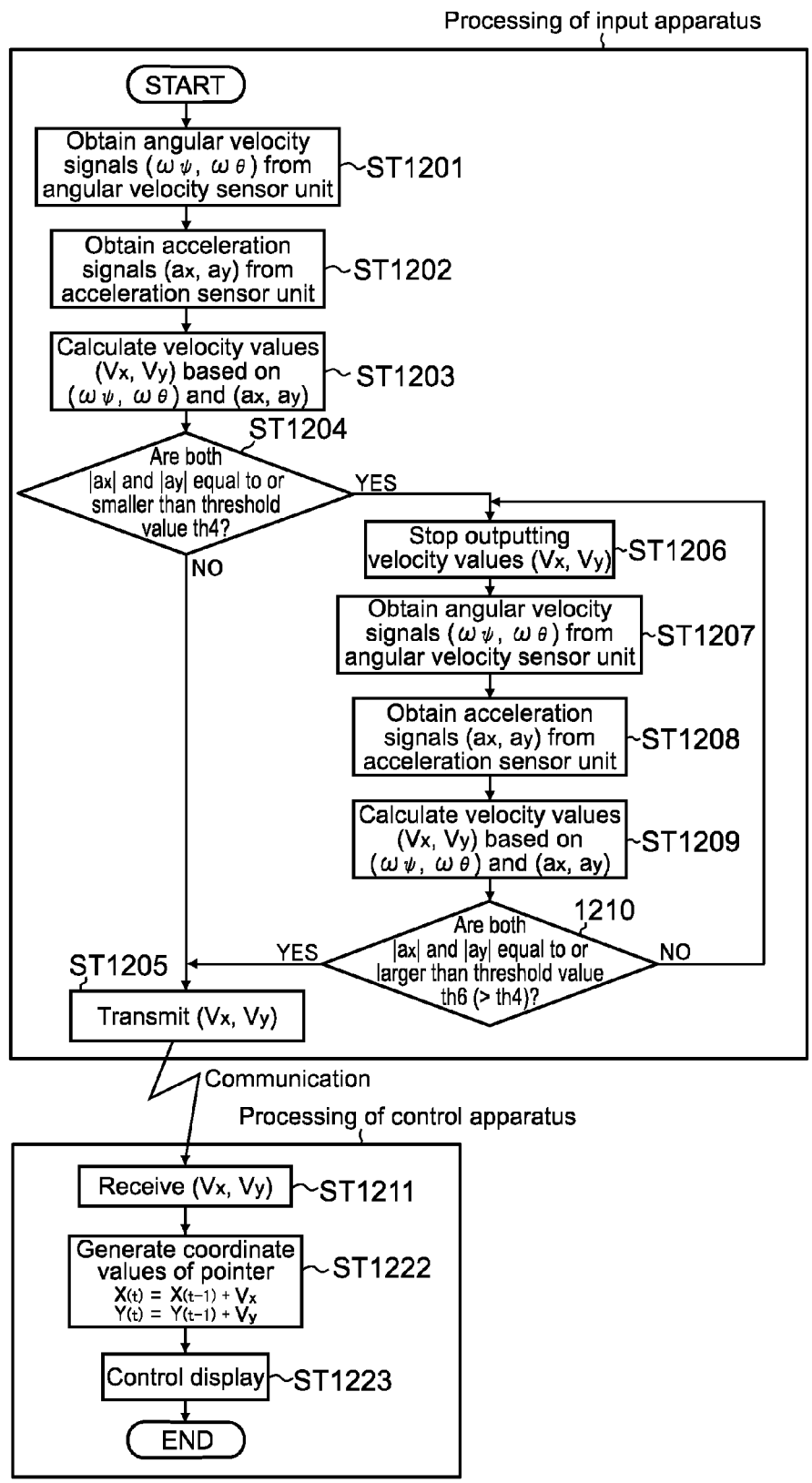
FIG. 20 A flowchart showing an operation of the control system according to still another embodiment.

FIG. 20 is a flowchart showing an operation of the control system 100 according to still another embodiment. In this embodiment, a case where the biaxial acceleration sensor unit 16 and the biaxial angular velocity sensor unit 15 are used will be described.

Processes of Steps 1201 to 1206 are the same as those of Steps 101 to 106.

After Step 1206, the MPU 19 carries out processes the same as those of Steps 1201 to 1203 (Steps 1207 to 1209). The MPU 19 judges whether both $|a_x|$ and $|a_y|$ are equal to or larger than a threshold value th6 (Step 1210).

As long as the threshold value th6 is set to a value larger than th4, the setting can be changed as appropriate. The threshold value th6 is set for the acceleration values at a time when the position of the input apparatus 1 is tilted within a range of, for example, angle $|±β|=α+(5 \text{ to } 20°)$ or $|±β|=α+(5 \text{ to } 50°)$. However, the angle ±β is not limited to those ranges. Alternatively, the angle ±β may be set in view of the following aspects, for example.

For example, when resuming the pointing operation, the user tries to move the input apparatus 1 so that the position thereof becomes the reference position. Therefore, the angle β can be set as an angle of the casing 10 in the reference position or a position close to the reference position.

The user may be allowed to customize the angle β by an adjustment means similar to that described above.

In this embodiment, the MPU 19 continues executing the decorrelation processing when it is judged that the position of the input apparatus 1 is within the angle ±β range. Accordingly, it is possible to prevent a situation where the movement of the pointer 2 is not always stopped or started from being repeated frequently in the case where the input apparatus 1 is unintentionally moved by the user.

Also in the flowchart shown in FIG. 20, the control apparatus 40 may carry out the judgment processing and calculation of the velocity values in the same manner as the processing of FIG. 12 or 13. In this case, the control apparatus 40 mainly executes Steps 1204 (or 1203), 1206 to 1210, 1222, and 1223.

A part of the flowchart shown in FIG. 20 may be combined with the flowchart shown in FIG. 19. In this case, when described based on the flow of FIG. 19, the MPU 19 executes the judgment processing of Step 1210 after Step 1112, for example. In the judgment processing, when both $|a_x|$ and $|a_y|$ are equal to or larger than the threshold value th6, the MPU 19 advances to Step 1105. Otherwise, the MPU 19 stops outputting the velocity values and sequentially repeats the processes of Steps 1110, 1111, 1112, and 1210.

Alternatively, the processing as shown in FIGS. 16 to 18 carried out in the case where the triaxial acceleration sensor unit 116 is used may be incorporated in the flowchart shown in FIG. 20. In this case, the process of Step 404, 504, or 604 is executed instead of Step 1204 and/or 1210. In the case of this processing, it goes without saying that different threshold values are used for the process corresponding to Step 1204 and the process corresponding to Step 1210. Specifically, it is only necessary that, when the judgment processing of Step 404 shown in FIG. 16 is incorporated in the processing of FIG. 20, the decorrelation processing be canceled when $|a_z|$ has become equal to or smaller than a threshold value th7 that is smaller than the threshold value th5 in Step 1210, for example.

In the processing shown in FIG. 20, it is also possible for the MPU 19 to transmit a signal for displaying the pointer 2 at a predetermined coordinate position on the screen 3 when the position of the input apparatus 1 has come out of the angle ±α (±β) range after entering the angle ±α range (generation means). Alternatively, the control apparatus 40 may execute such processing. As described above, when it is already recognized by the user that the pointer 2 will be displayed at a predetermined coordinate position on the screen 3, it becomes easier to perform a pointing operation after the position of the input apparatus 1 has come out of the angle ±α range.

The predetermined coordinate position is typically a center position of the screen 3. For example, the user often restores a state where the pointer 2 can be moved while facing the input apparatus 1 toward a center of the screen 3. Therefore, if the pointer 2 starts moving from the center position of the screen 3, the operation becomes more intuitive for the user.

However, the predetermined coordinate position is not limited thereto and may be an arbitrary position on the screen. The input apparatus 1 or the control apparatus 40 may include means for causing the user to customize the coordinate position. A typical example of the customization means is software including GUI included in the control apparatus 40. However, as the customization means, other mechanical switches or the like may be provided to the input apparatus 1 or the control apparatus 40.

The processing in which the MPU 19 transmits a signal for display at a predetermined coordinate position on the screen 3 when the position of the input apparatus 1 has come out of the angle ±α range is not limited to the case of the application to the embodiment shown in FIG. 20. The processing may also be applied to FIGS. 9, 12, 13, and 16 to 19.

As a modified example of FIGS. 9, 12, 13, and 16 to 20, the decorrelation processing may be canceled by the following processing when the position of the input apparatus 1 has come out of the angle ±α or ±β range after entering the angle ±α range. Specifically, in the case where the position of the input apparatus 1 has come out of the angle ±α or ±β range, the MPU 19 may cancel the decorrelation processing when the user makes an input to an operation switch (not shown) provided to the input apparatus 1, for example (cancel means).

Examples of the mechanism for the input of the operation switch include the buttons 11, 12, and 13. Among those, the button 11 as an enter button may be employed. However, an additional operation section may be provided as the operation switch. Accordingly, the user can restore a state where a pointing operation can be made with an intuitive operation.

In the above embodiments, the decorrelation processing has been executed when the position of the casing 10 of the input apparatus 1 is tilted downward or upward by the angle ±α. However, it is also possible for the decorrelation processing to be executed when the input apparatus 1 is rotated a predetermined angle in the roll angle direction about the Z' axis from the reference position, for example. In the case of the sensor unit 17 shown in FIG. 8, a roll angle φ is calculated by an operation that is based on a ratio of the X' axis and the Y' axis of the acceleration sensor unit 16, that is, by φ=arctan $(a_x/a_y)$.

In the processing shown in FIGS. 9, 12, 13, and 16 to 20, the MPU 19 may stop power supply to at least one of the acceleration sensor unit 16, the angular velocity sensor unit 15, and the transmitting device 21 while the output of the velocity values is stopped. For example, a structure in which the acceleration sensor unit 16 is provided but the angular velocity sensor unit 15 is not is conceivable. In this case, the velocity values $(V_x, V_y)$ are obtained by integrating the acceleration values $(a_x, a_y)$ detected by the acceleration sensor unit 16 in Step 103 (provided that in this case, angular velocity values $(\omega_\psi, \omega_\theta)$ about the Y axis and X axis cannot be obtained). It is also possible for the accelerations to be calculated by an image sensor instead of the acceleration sensor unit 16.

An angle sensor or an angular acceleration sensor may be used instead of the angular velocity sensor unit 15. Examples of the angle sensor include a geomagnetic sensor and an image sensor. Change amounts of angle values are detected when using, for example, triaxial geomagnetic sensors. Thus, in this case, the angle values are differentiated to thus obtain angular velocity values. The angular acceleration sensor is constituted as a combination of a plurality of acceleration sensors, and the angular velocity values are obtained by integrating angular acceleration values obtained by the angular acceleration sensor. In terms of such embodiments, mainly the MPU 19 or 35 functions as a calculation means for outputting angle-related values as values related to angles.

For example, the angular acceleration sensor for detecting angular accelerations about the Y axis and the X axis or a sensor for detecting angles may be used in calculating radius gyrations R(t) as described above. In this case, the angular velocity values $(\omega_\psi, \omega_\theta)$ are obtained by integrating the angular acceleration values detected by the angular acceleration sensor. Alternatively, the angular velocity values $(\omega_\psi, \omega_\theta)$ are obtained by differentiating the angle values detected by the angle sensor.

As a uniaxial angular acceleration sensor as the angular acceleration sensor above, two uniaxial acceleration sensors disposed on the radius gyrations R(t) are typically used. A difference between two acceleration values obtained by the two acceleration sensors is divided by a distance between the two acceleration sensors to thus calculate an angular velocity value of the input apparatus 1 (or 101; hereinafter referred to as input apparatus 1 or the like). Similar to the detection principle of the two uniaxial acceleration sensors described above, two biaxial acceleration sensors only need to be used as the biaxial angular acceleration sensor. In this case, in addition to the geomagnetic sensor and the image sensor, the biaxial acceleration sensors only need to be used as the angle sensor so as to realize a principle of obtaining, for example, a roll angle φ (angle about Z axis in FIG. 8). Therefore, the two biaxial acceleration sensors only need to be used for detecting biaxial angles about the Y axis and the X axis.

Examples of the image sensor include a CCD (Charge Coupled Device) and a CMOS (Complementary Metal-Oxide Semiconductor).

In the above embodiments, the input apparatus 1 or the like has been described as an input apparatus that monitors a relative position of the movement of the casing of the input apparatus 1 or the like and the movement of the pointer 2 on the screen 3. However, the input apparatus 1 or the like may be used as an input apparatus that monitors an absolute position within a 3D space. As the input apparatus that monitors an absolute position within a 3D space, an input apparatus that includes triaxial geomagnetic sensors and biaxial acceleration sensors (360-degree detection sensors) is used. Among those, as the motion signal of the casing, acceleration values detected by the biaxial acceleration sensors or angular velocities as differential values of angles obtained by the triaxial geomagnetic sensors are used.

Alternatively, the input apparatus 1 or the like may include a tilt sensor (not shown) that detects only a position of the input apparatus 1 or the like. The tilt sensor includes a housing, a conductive member that rolls inside the housing (e.g., conductive ball), and an electrode terminal that comes into contact with the conductive member that moves inside the housing by a gravity action when a predetermined tilt is applied to the input apparatus 1, for energization.

In the input apparatuses of the above embodiments, input information has been transmitted to the control apparatus wirelessly. However, the input information may be transmitted by wire.

The present embodiment may be applied to, for example, a handheld-type information processing apparatus (handheld apparatus) including a display section. In this case, by the user moving a main body of the handheld apparatus, a pointer displayed on the display section is moved. Examples of the handheld apparatus include a PDA (Personal Digital Assistance), a cellular phone, a portable music player, and a digital camera.

In the above embodiments, the pointer 2 that moves on the screen in accordance with the movement of the input apparatus 1 has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An input apparatus for controlling a movement of a pointer on a screen, the input apparatus comprising:
    a casing;
    an output means for detecting a status of the casing regarding a movement and position of the casing and outputting a status signal indicating the status of the casing;
    a movement signal output means for outputting a movement signal for moving the pointer on the screen based on a motion signal as a signal on the movement of the casing out of the status signal that has been output;
    a first judgment means for judging which of a first position as a predetermined position and a second position that is not the predetermined position the detected position of the casing is; and
    an execution means for executing, in response to determining that the detected position of the casing is the first position, decorrelation processing for setting a status of the pointer on the screen to a status uncorrelated to the motion signal.

2. The input apparatus according to claim 1, further comprising
    a time judgment means for judging whether a state where the position of the casing is the first position is maintained for a predetermined time period,
    wherein the execution means executes the decorrelation processing when the state where the position of the casing is the first position is maintained for the predetermined time period.

3. The input apparatus according to claim 1, further comprising
    a second judgment means for judging whether the position of the casing is within a predetermined positional range that includes the first position and is wider than the first position, after the casing has shifted from the second position to the first position,
    wherein the execution means continues executing the decorrelation processing when the position of the casing is within the predetermined positional range that is wider than the first position.

4. The input apparatus according to claim 1,
    wherein the output means outputs, as the status signal, a first acceleration value of the casing in a direction along a first axis and a second acceleration value of the casing in a direction along a second axis different from the first axis.

5. The input apparatus according to claim 4,
    wherein the first judgment means judges whether absolute values of both the first acceleration value and the second acceleration value are equal to or smaller than a threshold value, and judges that the detected position of the casing is the first position when both of the absolute values are equal to or smaller than the threshold value.

6. The input apparatus according to claim 1, further comprising
    a mounting section to which a holder for holding the input apparatus at an arbitrary place is mounted,
    wherein the first judgment means judges which of the first position and the second position the position of the casing is with a predetermined positional range centering on a position at which a virtual line, which connects the mounting section and a center of gravity of the input apparatus, coincides with a gravity direction being set as the first position.

7. The input apparatus according to claim 1, further comprising
    a cancel means including an operation switch, for canceling the decorrelation processing by the execution means when it is judged by the first judgment means that the position of the casing has shifted from the first position to the second position and when an input signal from the operation switch is obtained.

8. A control method comprising:
    detecting a status of a casing of an input apparatus regarding a movement and position of the casing;
    outputting a status signal indicating the status of the casing;
    outputting a movement signal for moving the pointer on the screen based on a motion signal as a signal on the movement of the casing out of the status signal that has been output;
    generating coordinate information of the pointer on the screen based on the movement signal;

judging which of a first position as a predetermined position and a second position that is not the predetermined position the position of the casing is based on the status signal; and executing, in response to determining that the position of the casing is the first position, decorrelation processing for setting a status of the pointer on the screen to a status uncorrelated to the motion signal.

9. A handheld apparatus for controlling a movement of a pointer on a screen, the handheld apparatus comprising:

a casing;

a display section to display the screen;

an output means for detecting a status of the casing regarding a movement and position of the casing and outputting a status signal indicating the status of the casing;

a movement signal output means for outputting a movement signal for moving the pointer on the screen based on a motion signal as a signal on the movement of the casing out of the status signal that has been output;

a first judgment means for judging which of a first position as a predetermined position and a second position that is not the predetermined position the detected position of the casing is; and an execution means for executing, in response to determining that the detected position of the casing is the first position, decorrelation processing for setting a status of the pointer on the screen to a status uncorrelated to the motion signal.

* * * * *